(12) United States Patent
Choi et al.

(10) Patent No.: US 10,708,670 B2
(45) Date of Patent: Jul. 7, 2020

(54) IMAGE DISPLAY APPARATUS AND METHOD OF OPERATING THE SAME

(71) Applicant: SAMSUNG ELECTRONICS CO., LTD., Suwon-si (KR)

(72) Inventors: Kil-soo Choi, Yongin-si (KR); Kwan-sik Yang, Suwon-si (KR); Se-hyun Kim, Suwon-si (KR); Young-il Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/054,330

(22) Filed: Aug. 3, 2018

(65) Prior Publication Data

US 2019/0069042 A1 Feb. 28, 2019

(30) Foreign Application Priority Data

Aug. 28, 2017 (KR) .......................... 10-2017-0108843

(51) Int. Cl.
*H04N 21/81* (2011.01)
*H04N 21/485* (2011.01)
(Continued)

(52) U.S. Cl.
CPC ..... *H04N 21/8173* (2013.01); *H04N 21/2385* (2013.01); *H04N 21/4383* (2013.01);
(Continued)

(58) Field of Classification Search
CPC ............ H04N 21/8173; H04N 21/485; H04N 21/4516; H04N 21/2385; H04N 21/4782;
(Continued)

(56) References Cited

U.S. PATENT DOCUMENTS 9,596,428 B2 3/2017 Jackson
2010/0306794 A1* 12/2010 Wang .................. H04N 21/438
725/27

(Continued)

FOREIGN PATENT DOCUMENTS

JP 2013-132010 A 7/2013
KR 10-2008-0075634 A 8/2008
(Continued)

OTHER PUBLICATIONS

Communication dated Nov. 23, 2018 issued by the International Searching Authority in Counterpart Application No. PCT/KR2018/009497 (PCT/ISA/220, PCT/ISA/210, and PCT/ISA/237).
(Continued)

*Primary Examiner* — Yassin Alata
(74) *Attorney, Agent, or Firm* — Sughrue Mion, PLLC

(57) ABSTRACT

A display apparatus and a method of operating the same are provided. The display apparatus includes a display; a memory configured to store at least one instruction; and a processor configured to execute the at least one instruction to: generate an integrated channel list, which includes first channel information that corresponds to an external image providing apparatus connected to the display apparatus and second channel information that corresponds to an application installed in the display apparatus. The first channel information includes information about channels provided by an external image providing apparatus and the second channel information includes information about channels which are provided by an application. In response to an input of selecting one channel from the integrated channel list, the display apparatus controls a source corresponding to the selected channel to provide content obtained from the controlled source.

14 Claims, 13 Drawing Sheets

(51) Int. Cl.
 *H04N 21/45* (2011.01)
 *H04N 21/2385* (2011.01)
 *H04N 21/4782* (2011.01)
 *H04N 21/482* (2011.01)
 *H04N 21/462* (2011.01)
 *H04N 21/438* (2011.01)

(52) U.S. Cl.
 CPC ..... *H04N 21/4516* (2013.01); *H04N 21/4622* (2013.01); *H04N 21/4782* (2013.01); *H04N 21/485* (2013.01); *H04N 21/4823* (2013.01)

(58) Field of Classification Search
 CPC ........... H04N 21/4823; H04N 21/4622; H04N 21/4383
 See application file for complete search history.

(56) References Cited

U.S. PATENT DOCUMENTS

| | | |
|---|---|---|
| 2014/0351864 A1 | 11/2014 | Tateishi et al. |
| 2015/0150071 A1 | 5/2015 | Seo et al. |
| 2016/0255403 A1 | 9/2016 | Gomes et al. |
| 2017/0201800 A1 | 7/2017 | Jung et al. |

FOREIGN PATENT DOCUMENTS

| | | |
|---|---|---|
| KR | 10-2009-0111231 A | 10/2009 |
| KR | 10-1116016 B1 | 2/2012 |
| KR | 10-2013-0056862 A | 5/2013 |
| KR | 10-1564415 B1 | 10/2015 |
| WO | 2006/096570 A2 | 9/2006 |

OTHER PUBLICATIONS

Communication dated Oct. 11, 2018 issued by the European Patent Office in Counterpart European Application No. 18187571.7.

* cited by examiner

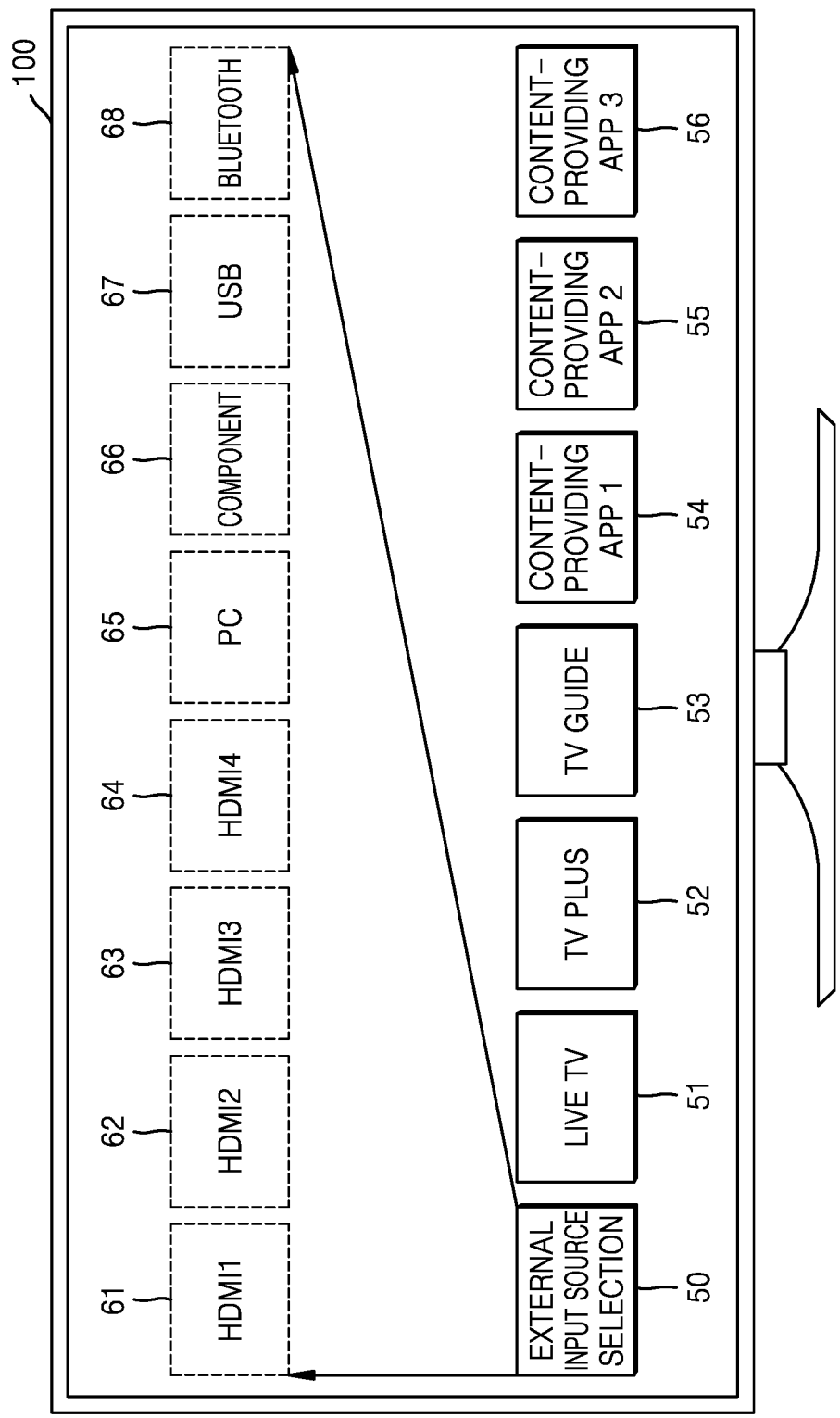

FIG. 2A

SET-TOP BOX
CHANNEL LIST

21

... 05 SBS
07 KBS2
09 KBS1
11 MBC
15 JTBC ...

SET-TOP BOX CHANNELS

FIG. 2B

TV CHANNEL LIST

22

... 05 SBS
07 KBS2
09 KBS1
11 MBC ...

TV CHANNELS

FIG. 2C

VIRTUAL CHANNEL LIST

23

600 TVPlus 1
601 TVPlus 2
...

VIRTUAL CHANNELS

FIG. 2D

TV MODE INTEGRATED CHANNEL LIST

24

... 05 SBS
07 KBS2
09 KBS1
11 MBC ...

600 TVPlus 1
601 TVPlus 2
...

TV CHANNELS

VIRTUAL CHANNELS

FIG. 2E

SET-TOP BOX MODE INTEGRATED CHANNEL LIST

25

... 05 SBS
07 KBS2
09 KBS1
11 MBC
15 JTBC ...

600 TVPlus 1
601 TVPlus 2
...

SET-TOP BOX CHANNELS

VIRTUAL CHANNELS

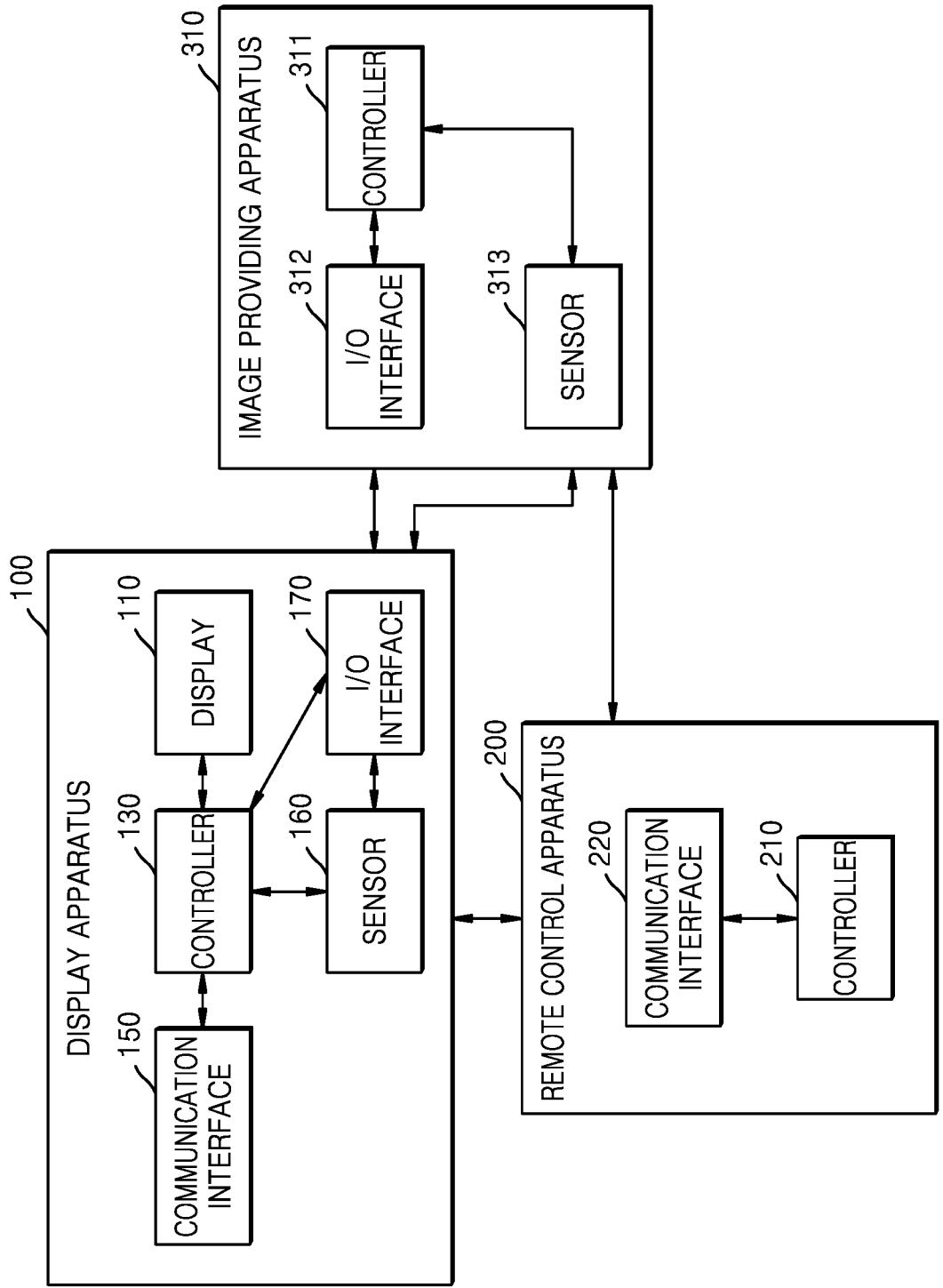

FIG. 7A

SET-TOP BOX MODE CHANNEL LIST 710

| CHANNEL NUMBER | CHANNEL ID | SOURCE |
|---|---|---|
| 005 | SBS | STB |
| 007 | KBS2 | STB |
| 011 | MBC | STB |
| 015 | JTBC | STB |
| 005-601 | SBS TVPlus1 | VIRTUAL CHANNEL |
| 005-602 | SBS TVPlus2 | VIRTUAL CHANNEL |
| 011-603 | MBC TVPlus1 | VIRTUAL CHANNEL |

FIG. 7B

TV MODE CHANNEL LIST 720

| CHANNEL NUMBER | CHANNEL ID | SOURCE |
|---|---|---|
| 005 | SBS | DTV |
| 007 | KBS2 | DTV |
| 011 | MBC | DTV |
| 601 | SBS TVPlus1 | VIRTUAL CHANNEL |
| 602 | SBS TVPlus2 | VIRTUAL CHANNEL |
| 603 | MBC TVPlus1 | VIRTUAL CHANNEL |

| CHANNEL NUMBER | CHANNEL ID | SOURCE |
|---|---|---|
| 001 | | SET-TOP BOX |
| 002 | | SET-TOP BOX |
| 003 | | SET-TOP BOX |
| ... | | SET-TOP BOX |
| 099 | | SET-TOP BOX |
| 100 | | SET-TOP BOX |
| 101 | | VIRTUAL CHANNEL |
| 102 | | VIRTUAL CHANNEL |

810 — CHANNEL NUMBER
820 — CHANNEL ID
830 — SOURCE

| CHANNEL NUMBER | CHANNEL ID | SOURCE |
|---|---|---|
| 005 | SBS | STB |
| 005-601 | SBS TVPlus1 | VIRTUAL CHANNEL |
| 005-602 | SBS TVPlus2 | VIRTUAL CHANNEL |
| 007 | KBS2 | STB |
| 011 | MBC | STB |
| 011-603 | MBC TVPlus1 | VIRTUAL CHANNEL |

FIG. 10

| CHANNEL NUMBER | CHANNEL ID | SOURCE |
|---|---|---|
| 005 | ASBS | DTV |
| 006 | AKBS2 | STB |
| 010 | AMBC2 | STB |
| 16 | AJTBC2 | STB |
| 17 | ATVN2 | STB |
| 600 | ATVPlus1 | VIRTUAL CHANNEL |
| 601 | ATVPlus2 | VIRTUAL CHANNEL |
| 602 | ATVPlus3 | VIRTUAL CHANNEL |
| 700 | PC | PC PORT |
| 800 | Play Station | HDMI1 |
| 900 | BD PLAYER | HDMI2 |
| 1000 | USB | USB PORT |
| 1100 | MOBILE PHONE | MOBILE PHONE |
| 1200 | CONTENT-PROVIDING APP 1 | APPLICATION |
| 1300 | CONTENT-PROVIDING APP 2 | APPLICATION |
| 1400 | TV GUIDE APP | APPLICATION |

1010 — GENERAL TV CHANNEL
1020 — SET-TOP BOX CHANNELS
1030 — VIRTUAL CHANNELS
1040 — EXTERNAL APPARATUS CHANNELS
1050 — APPLICATIONS

1000

IMAGE DISPLAY APPARATUS AND METHOD OF OPERATING THE SAME

CROSS-REFERENCE TO RELATED APPLICATION(S)

This application is based on and claims priority under 35 U.S.C. § 119 to Korean Patent Application No. 10-2017-0108843, filed on Aug. 28, 2017, in the Korean Intellectual Property Office, the disclosure of which is incorporated by reference herein in its entirety.

BACKGROUND

1. Field

The disclosure relates to a display apparatus and a method of operating the same, and more particularly, to a display apparatus providing an integrated channel list, and a method of operating the display apparatus.

2. Description of Related Art

Image display apparatuses have a function of displaying an image that can be watched by users. Users can watch broadcast content via an image display apparatus. Image display apparatuses display, on a display included therein, broadcast content that a user selects from broadcasting signals transmitted by a broadcasting station. Most countries around the world have switched from analog broadcasting to digital broadcasting.

In digital broadcasting, a digital image signal and a digital audio signal are transmitted. When compared to analog broadcasting, digital broadcasting is resilient against external noise, thus having little data loss, is favorable to error correction, and provides high-resolution and high-definition screen images. In addition, digital broadcasting can provide a bidirectional service, in contrast to analog broadcasting.

Smart televisions (TVs) providing various types of content in addition to a digital broadcasting function have been recently provided. Smart TVs aim to analyze and provide user needs without manipulations by a user, instead of being manually operated according to a selection by a user.

According to related art, when a channel is watched by connecting a set-top box to a TV, content of the set-top box is output to the TV via a high-definition multimedia interface (HDMI), and, in order to be able to watch general TV broadcasting and a virtual channel, a user needs to switch to a TV mode instead of an HDMI source. As such, general TV channels and virtual channels operate independently to the set-top box channels. Thus, when the user wants to watch a set-top box channel while watching a TV channel or a virtual channel, the mode of a TV should be switched.

The above information is presented as background information only to assist with an understanding of the present disclosure. No determination has been made, and no assertion is made, as to whether any of the above might be applicable as prior art with regard to the present disclosure.

SUMMARY

Provided are a display apparatus that supports virtual channels, synthesizes channel information of a set-top box, and switches a channel within an integrated channel list, and a method of operating the display apparatus.

Additional aspects will be set forth in part in the description which follows and, in part, will be apparent from the description, or may be learned by practice of the presented embodiments. Illustrative, non-limiting embodiments may overcome the above disadvantages and other disadvantages not described above. The present disclosure is not necessarily required to overcome any of the disadvantages described above, and illustrative, non-limiting embodiments may not overcome any of the problems described above. The appended claims should be consulted to ascertain the true scope of an inventive concept.

In accordance with an aspect of the disclosure, a display apparatus includes a display; a memory configured to store at least one instruction; and a processor configured to execute the at least one instruction to: generate an integrated channel list including first channel information corresponding to an external image providing apparatus connected to the display apparatus and second channel information corresponding to an application installed in the display apparatus, where the first channel information includes information about a plurality of channels provided by the external image providing apparatus, and the second channel information includes information about a plurality of channels provided by the application, identify current channel information corresponding to a content currently being displayed on the display, in response to a user input of requesting a channel switch, determine a target channel, based on the identified current channel information and the integrated channel list, identify whether a source corresponding to the target channel is external image providing apparatus or the application, and control the identified source to display an image corresponding to the determined target channel.

When the display apparatus is turned on, it may determine whether the external image providing apparatus has been turned on. When the external image providing apparatus has been turned on, the display apparatus may configure the integrated channel list to include the first channel information and the second channel information. On the other hand, when the external image providing apparatus has been turned off, the display apparatus may configure the integrated channel list to only include the second channel information and to exclude the first channel information.

The processor may further be configured to execute the at least one instruction to: when content received from the external image providing apparatus is displayed on the display, obtain the current channel information by recognizing one or more characters from a content image of the content displayed on the display apparatus; and when content received via the application is displayed on the display, obtain the current channel information, based on the second channel information provided from the application.

The processor may further be configured to execute the at least one instruction to: when a source corresponding to the determined target channel is different from a source corresponding to the identified current channel information, switch an image source of the display apparatus to the source corresponding to the determined target channel.

The processor may further be configured to execute the at least one instruction to, when the identified current channel information corresponds to a channel range providable by the external image providing apparatus and the determined target channel corresponds to a channel range providable by the application installed in the display apparatus, switch the image source of the display apparatus to the application and provide information about the determined target channel to the application. In this case, the display apparatus may execute the application.

The processor may further be configured to execute the at least one instruction to, when the identified current channel information corresponds to a channel range providable by the application and the determined target channel corresponds to a channel range providable by the external image providing apparatus, switch the image source of the display apparatus to an external source corresponding to the external image providing apparatus and provide information about the determined target channel to the external image providing apparatus. In this case, the display apparatus may transmit a message requesting power on to the external image providing apparatus.

The processor may further be configured to execute the at least one instruction to: generate a channel control code signal based on the target channel information; and transmit the generated channel control code signal to the external image providing apparatus by using an infrared (IR) blaster or transmit the generated channel control code signal to a remote control apparatus such that the channel control code signal is to be transmitted by the remote control apparatus to the external image providing apparatus.

The processor may further be configured to execute the at least one instruction to: when a source corresponding to the determined target channel is identical to a source corresponding to the identified current channel information, provide information about the determined target channel to the source that provides the currently-displayed content.

In accordance with yet another aspect of the disclosure, a method of operating a display apparatus is provided. The method includes generating an integrated channel list including first channel information corresponding to an external image providing apparatus connected to the display apparatus and second channel information corresponding to an application installed in the display apparatus, the first channel information including information about a plurality of channels which are provided by the external image providing apparatus, and the second channel information including information about a plurality of channels which are provided by the application, identifying current channel information corresponding to content currently being displayed on the display, in response to a user input of requesting a channel switch, determining a target channel, based on the identified current channel information and the integrated channel list, identifying whether a source corresponding to the target channel is external image providing apparatus or the application, and controlling the identified source to display an image corresponding to the determined target channel.

In accordance with another aspect of the disclosure, a computer program product includes one or more computer-readable storage media having recorded thereon a program, which, when executed by a computer, performs the above-described method.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1B is a view illustrating a user interface (UI) that may be displayed on a display apparatus, according to an embodiment;

FIGS. 2A-2E are schematic diagrams illustrating various channel lists, according to an embodiment;

FIG. 3 is a block diagram illustrating operations between a display apparatus, a set-top box, and a remote control apparatus, according to an embodiment;

FIGS. 7A and 7B are views illustrating an example of a set-top box mode channel list and an example of a television (TV) mode channel list, according to an embodiment;

FIG. 8 is a view illustrating a table of a channel list configured by a display apparatus, according to an embodiment;

FIG. 9 is a view illustrating a table of a channel list in which channels are arranged close to each other, based on the same broadcasting company, according to an embodiment;

FIG. 10 is a schematic diagram illustrating other external apparatus sources in addition to a set-top box being included in a channel list, according to an embodiment;

DETAILED DESCRIPTION OF EXEMPLARY EMBODIMENTS

Figure 1A:
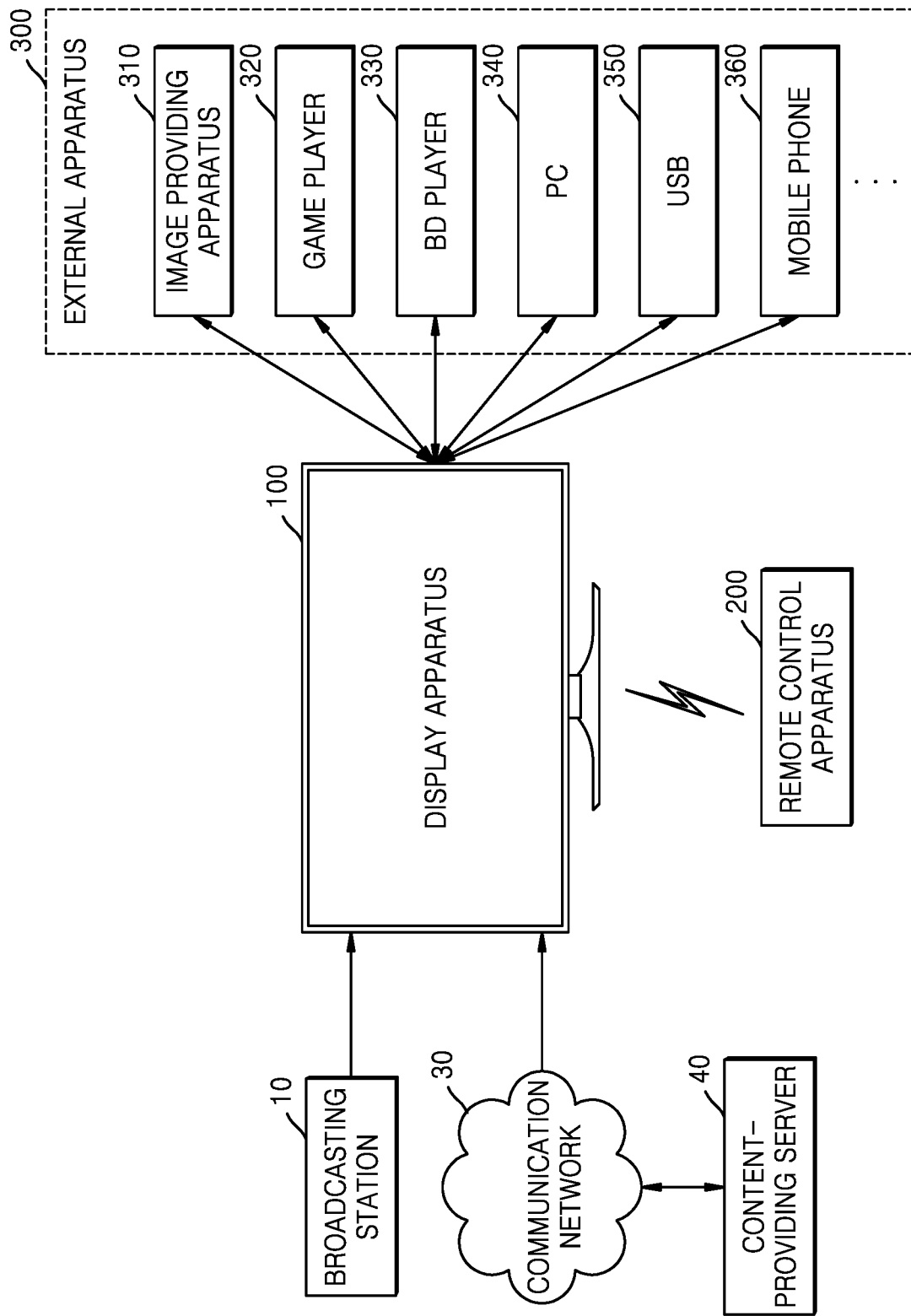
FIG. 1A is a schematic diagram illustrating a system, according to an embodiment.

Reference will now be made in detail to exemplary embodiments, examples of which are illustrated in the accompanying drawings, wherein like reference numerals refer to the like elements throughout. In this regard, the present embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the terms used in the specification will be briefly described, and then the disclosure will be described in detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or In operation is performed, and may be implemented as hardware, software, or a combination of hardware and software.

Exemplary embodiments are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

The term "user" used herein denotes a person who controls a function or operation of an image display apparatus by using a control apparatus. Examples of the user may include a viewer, a manager, or an installation engineer.

FIG. 1A is a schematic diagram illustrating a system according to an embodiment.

Referring to FIG. 1A, the system includes a display apparatus 100, a remote control apparatus 200, an external apparatus 300, a broadcasting station 10, a communication network 30, and a content-providing server 40.

The display apparatus 100 may process content data received via various sources and may display an image. The sources via which the display apparatus 100 receives the content data may include the broadcasting station 10, the content-providing server 40, and the external apparatus 300.

The display apparatus 100 may receive a radio frequency (RF) signal from the broadcasting station 10 by using an RF antenna.

The display apparatus 100 may receive content from the content-providing server 40 via the communication network 30, based on an Internet protocol.

The display apparatus 100 may receive content from the external apparatus 300 connected to the display apparatus 100 via a wired interface, such as various ports or a High-Definition Multimedia Interface (HDMI), or a wireless interface, such as Wi-Fi, Wi-Fi direct, or Bluetooth. Examples of the external apparatus 300 may include an image providing apparatus 310 (such as, a set-top box), a game player 320, a blu-ray disc (BD) player 330, a personal computer (PC) 340, a universal serial bus (USB) 350, and a mobile phone 360.

The image providing apparatus 310 is connected to the display apparatus 100 by wire or wirelessly, and processes an image signal received from an external source and outputs the processed image signal to the display apparatus 100.

The display apparatus 100 may also receive content from a mobile device to which the display apparatus 100 is communicably connected, and may obtain content data from a memory embedded in the display apparatus 100 or a memory to which the display apparatus 100 is locally connected.

According to an exemplary embodiment, the display apparatus 100 may select one from among various image providing sources, as described above, and may process content data received from the selected image providing source to thereby display a content image. The display apparatus 100 may provide various user interface (UI) environments enabling a user to select one from among various image providing sources, and an example of a UI environment is the remote control apparatus 200.

The remote control apparatus 200 is basically implemented using a device physically separated and spaced apart from the display apparatus 100 and is provided to be easily held and carried by a user, according to an exemplary embodiment. The remote control apparatus 200 may be a remote control apparatus designed and manufactured to correspond to the display apparatus 100 while the display apparatus 100 is being manufactured, or may be a general-use remote control apparatus.

In order for the remote control apparatus 200 to control an operation of the display apparatus 100 according to a user's manipulation, the display apparatus 100 needs to recognize a control signal transmitted by the remote control apparatus 200. Accordingly, information of each operation of the display apparatus 100 corresponding to the control signal transmitted by the remote control apparatus 200 is previously prescribed. This information is referred to as a code set. The code set needs to be installed or stored in each of the remote control apparatus 200 and the display apparatus 100 before the remote control apparatus 200 controls the display apparatus 100. However, there are other cases than the case where the remote control apparatus 200 is designed and manufactured to correspond to the display apparatus 100 while the display apparatus 100 is being manufactured. The remote control apparatus 200 may be an input device manufactured by a different manufacturing company from the manufacturing company of the display apparatus 100. However, a code set for controlling the display apparatus 100 may be installed in the remote control apparatus 200 later, such that the remote control apparatus 200 may be able to control the display apparatus 100. Likewise, in order for the remote control apparatus 200 to control the image providing apparatus 310, a code set for controlling the image providing apparatus 310 may be stored in the remote control apparatus 200. The remote control apparatus 200 may be any of various types of devices for controlling the display apparatus 100, such as a remote controller or a mobile phone.

The display apparatus 100 according to an exemplary embodiment may be a TV, but this is merely an example. The display apparatus 100 may be implemented as an electronic device including a display. For example, the display apparatus 100 may be any type of electronic device, such as a mobile phone, a tablet PC, a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. The display apparatus 100 may be implemented using not only a flat display apparatus but also a curved display apparatus having a curvature or a flexible display apparatus capable of adjusting a curvature. An output resolution of the display apparatus 100 may be, for example, a high definition (HD), a full HD, an ultra HD, or a resolution that is clearer than an ultra HD.

The display apparatus 100 may receive a broadcasting signal to which a channel is allocated for each frequency, from transmission equipment of a broadcasting station via an RF antenna or a cable. The display apparatus 100 may also receive various pieces of content, such as a streaming service, a web service, a game service, and a social network service, based on an Internet protocol. A channel number may be assigned to each of a plurality of pieces of content provided based on an Internet protocol, such as IP streaming, an application, or a web page. A service enabling a user to access and immediately view content via the same experience as that in the case of a general broadcasting channel, such as an electronic program guide (EPG), a channel list, channel up and down, or a channel number input, by assigning respective channel numbers to pieces of content provided based on an Internet protocol as described above, is referred to as a virtual channel service. In this specification, such a virtual channel service is interchangeably used with a channel service that is provided by an application installed in the display apparatus 100.

In the system of FIG. 1A, when the display apparatus 100 contacts the image providing apparatus 310 and a user watches content provided by the image providing apparatus 310 in the related art, the content provided by the image providing apparatus 310 may be output to a screen of the display apparatus 100 via an HDMI. In addition, to watch general TV broadcasting and a virtual channel, the mode of the display apparatus 100 needs to be switched to a TV mode instead of an HDMI source. On the contrary, to watch content of a set-top box while watching general TV broadcasting and a virtual channel, the mode of the display apparatus 100 needs to be switched to the HDMI source. As such, general TV channels and virtual channels operate independently to set-top box channels. Thus, although the image providing apparatus 310 supports most of general TV channel broadcasting, even when the user wants to watch only a virtual channel, the mode of the display apparatus 100 needs to be switched to the TV mode.

Thus, according to an exemplary embodiment, when the image providing apparatus 310 is connected to the display apparatus 100, the display apparatus 100 may automatically configure an integrated channel list by integrating channels provided by the image providing apparatus 310 with channels provided by an application installed in the display apparatus 100 and may provide the integrated channel list to users. By providing the integrated channel list, application channels are included as a part of image providing apparatus channels, and thus a movement between the image providing apparatus channels and the application channels is enabled by only a channel up/down function that controls the image providing apparatus channels.

FIG. 1B is a view illustrating a user interface (UI) which the display apparatus 100 may provide to select an image source, according to an embodiment.

Referring to FIG. 1B, the display apparatus 100 displays a UI that provides a plurality of items for selecting an image source.

The plurality of items may include an external input source selection item 50 enabling one to be selected from among a plurality of external input sources, a live TV item 51 providing an RF channel, a TV plus item 52 providing a virtual channel, a TV guide item 53 providing an integrated channel electronic program guide (EPG), an item 54 for content-providing application (app) 1, an item 55 for content-providing app 2, and an item 56 for content-providing app 3.

When a user selects an item provided on a UI by using the remote control apparatus 200, for example, the display apparatus 100 may display content corresponding to the selected item or execute an application corresponding to the selected item.

Due to selection of the TV plus item 52, the display apparatus 100 connects to an external content-providing server, and accordingly displays content that is streamed and assigns a virtual channel to a uniform resource locator URL at which the content is streamed. The TV plus item 52 may provide a plurality of virtual channels. When a user changes a virtual channel, the display apparatus 100 displays a content that is streamed via an URL corresponding to the changed channel.

Due to a selection of the external input source selection item 50, the display apparatus 100 may provide and display a plurality of external input source items.

The plurality of external input source items may include both an input source provided via a wired interface and an input source provided via a wireless interface. FIG. 1B illustrates, for example, an HDMI1 item 61, an HDMI2 item 62, an HDMI3 item 63, an HDMI4 item 64, a PC item 65, a component item 66, a USB item 67, and a Bluetooth item 68. The display apparatus 100 may further display the present condition of a wired interface or a wireless interface and information about an external apparatus connected to the wired interface or the wireless interface.

When one of external input source items, as mentioned above, is selected by a user, the display apparatus 100 may display an image received from an external apparatus corresponding to the selected external input source.

FIG. 2 is a schematic diagram illustrating an integrated channel list, according to an embodiment.

Referring to FIG. 2, the display apparatus 100 may provide a TV channel list 22 corresponding to terrestrial broadcasting (over-the-air channel broadcasting) that may be received and displayed by a live TV app (for example, executed by a selection of the live TV item 51 of FIG. 1B) installed in the display apparatus 100, a set-top box channel list 21 corresponding to content of a set-top box, as an example of the external image providing apparatus 310, received via an HDMI source when the set-top box is connected to the display apparatus 100, and a virtual channel list 23 in which a virtual channel is assigned to content that is streamed via each TV plus (for example, executed by a selection of the TV plus item 52 of FIG. 1B) installed in the display apparatus 100, namely, via the Internet.

The set-top box channel list 21 corresponds to content provided by the set-top box connected to the display apparatus 100, and thus may be received directly from the set-top box or may be received from a set-top box provider.

The TV channel list 22 may be extracted from broadcasting signals received from broadcasting transmitting equipment of broadcasting stations or may be provided as an EPG from a separate server.

The virtual channel list 23 is obtained and managed by virtually assigning a channel number to each piece of content received based on an Internet protocol by the display apparatus 100 and making this assignment status in a list form. In the case of IP-based content, different display apparatuses receive content in different environments, and accordingly, such a virtual channel list may be configured in each display apparatus 100. However, a separate management server (not shown) is able to receive information about reception environment of IP-based content from the display apparatus 100 and provide a virtual channel service in accordance with a corresponding display apparatus 100.

When no set-top boxes are connected to the display apparatus 100, the display apparatus 100 may provide a TV mode integrated channel list 24 including the TV channel list 22 and the virtual channel list 23.

When a set-top box is connected to the display apparatus 100, the display apparatus 100 may provide a set-top box mode integrated channel list 25 including the set-top box channel list 21 and the virtual channel list 23. When a set-top box is connected to the display apparatus 100, the display apparatus 100 provides an integrated channel list obtained by combining the set-top box channel list 21 with the virtual channel list 23, and thus a user may easily change a channel by using a channel up/down button or the like of the remote control apparatus 200 without a mode switch of the display apparatus 100 by recognizing a virtual channel in the virtual channel list as a channel within the set-top box channel list.

The integrated channel list may be generated by the display apparatus 100, or may be generated by a separate server (not shown) and provided to the display apparatus 100.

Because the set-top box mode integrated channel list 25 includes both virtual channels corresponding to IP-based content and set-top box channels, a channel number may be assigned to each piece of content such that channel numbers are not repeated between the virtual channels and the set-top box channels. In the set-top box mode integrated channel list 25, channel numbers after the last channel number from among the set-top box channels in the set-top box channel list 21 may be assigned to the virtual channels.

For example, when the set-top box channels are numbered with 1 through 599, channel numbers after the channel number 599, which is the last number of the channel numbers given to the set-top box channels, may be assigned to the virtual channels. According to an exemplary embodiment, channel numbers starting from number 600, which is right next to number 599, may be assigned to the virtual channels. However, any number after the number 599 may be assigned to the virtual channels. Because the number of set-top box channels may increase, a plurality of preliminary channel numbers may be provided between the last channel number for a set-top box and the first channel number for a virtual channel.

FIG. 3 is a block diagram illustrating operations between the display apparatus 100, the image providing apparatus 310, and the remote control apparatus 200 according to an exemplary embodiment.

Referring to FIG. 3, the display apparatus 100 includes a display 110, a controller 130, a communication interface 150, a sensor 160, and an input/output (I/O) interface 170.

The display 110 may display content received from the set-top box 310, namely, the image providing apparatus 310, via the I/O interface 170 or virtual channel content received via the communication interface 150. The display 110 may display an integrated channel list generated by the controller 130.

The I/O interface 170 receives content from the image providing apparatus 310.

The sensor 160 senses a command or a control signal provided by the remote control apparatus 200 and transmits the sensed command or the sensed control signal to the controller 130.

The controller 130 controls all of the components of the display apparatus 100 and may include at least one processor.

According to an exemplary embodiment, the controller 130 of the display apparatus 100 may determine whether the image providing apparatus 310 connected to the I/O interface 170 is powered on, and, when the image providing apparatus 310 is powered on, the controller 130 may generate an integrated channel list by integrating an image providing apparatus channel list corresponding to content provided by the image providing apparatus 310 with a virtual channel list provided by an application installed in the display apparatus 100.

According to an exemplary embodiment, the controller 130 may receive a channel switch command from the remote control apparatus 200, check a source of a target channel, being a target of a channel switch according to the channel switch command, and control the source of the target channel.

According to an exemplary embodiment, the controller 130 may receive a channel switch command from the remote control apparatus 200, and, when the target channel according to the channel switch command is within a range of set-top box channels, the controller 130 may transmit a channel control code signal corresponding to the channel switch command directly to the image providing apparatus 310 or may transmit the channel control code signal to the image providing apparatus 310 via the remote control apparatus 200.

According to an exemplary embodiment, the controller 130 may identify channel information corresponding to content that is being currently displayed, by processing a content image displayed on the display 110 and recognizing a character from the content image. A set-top box adds a channel number corresponding to the transmitted content to a content image and transmits the content image with the channel number to a display apparatus. To recognize the channel number, the display apparatus periodically performs optical character recognition (OCR) for recognizing a character from an image, with respect to a certain area of the content image received from the set-top box.

According to an exemplary embodiment, the controller 130 may identify channel information corresponding to content that is being currently displayed, by receiving current channel information from the image providing apparatus 310. The display apparatus 100 may form a wireless network with the image providing apparatus 310 through an access point. The display apparatus 100 may send instruction for requesting the current channel information to the image providing apparatus 310 using the wireless network, and receiving the instruction, the image providing apparatus 310 may send, to the display apparatus, the current channel information corresponding to content that is being currently provided by the image providing apparatus 310 to the display apparatus 100.

The image providing apparatus 310 includes a controller 311, an I/O interface 312, and a sensor 313.

The controller 311 controls all of the components of the image providing apparatus 310 and may include at least one processor.

When the controller 311 of the image providing apparatus 310 receives a channel control code signal from the display apparatus 100 or the remote control apparatus 200, the controller 311 controls a channel provided by the image providing apparatus 310 according to the received channel control code signal and transmits content according to the channel control to the display apparatus 100 via the I/O interface 312.

When the controller 311 provides the content to the display apparatus 100, the controller 311 may add channel information corresponding to the content to a predetermined area of the content.

The I/O interface 312 transmits the content to the display apparatus 100 under the control of the controller 311.

The sensor 313 senses the channel control code signal received from the display apparatus 100 or the remote control apparatus 200 and transmits the sensed channel control code signal to the controller 311. For example, the sensor 313 may sense a channel control infrared (IR) signal from an IR blaster or the like connected to the display apparatus 100 or may sense a channel control IR signal from the remote control apparatus 200 that received the channel control code signal from the display apparatus 100.

The remote control apparatus 200 includes a controller 210 and a communication interface 220.

The controller 210 controls the components of the remote control apparatus 200 and may include at least one processor.

The controller 210 of the remote control apparatus 200 may receive a user input, for example, a channel switch input, via an input interface, and transmit a command corresponding to the received user input, for example, a channel switch command, to the display apparatus 100 via an IR radiator or the like.

The communication interface 220 may receive a channel control code signal from the display apparatus 100.

The controller 210 may control the IR radiator to transmit a channel control IR signal corresponding to the channel control code signal received from the display apparatus 100 to the image providing apparatus 310.

Figure 4:
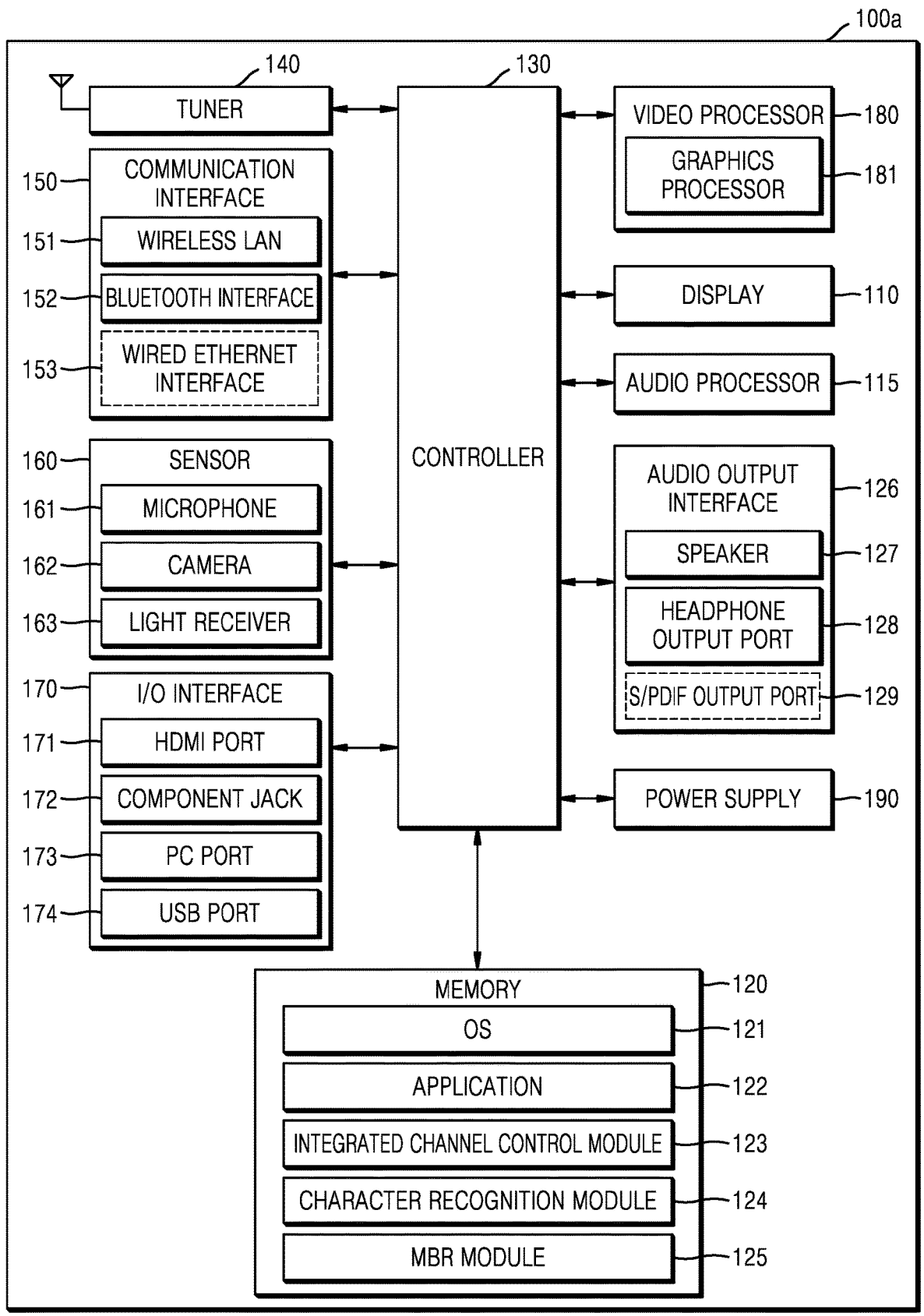
FIG. 4 is a block diagram illustrating a display apparatus, according to an embodiment.

FIG. 4 is a block diagram illustrating a display apparatus, according to an exemplary embodiment. The display apparatus 100*a* of FIG. 4 may be an embodiment of the display apparatus 100 of FIGS. 1A and 1B.

Referring to FIG. 4, the display apparatus 100*a* may further include a video processor 180, an audio processor 115, an audio output interface 126, a power supply 190, a tuner 140, and a memory 120, in addition to the display 110, the controller 130, the communication interface 150, the sensor 160, and the I/O interface 170.

Matters described above with reference to FIG. 4 which are the same as those of FIG. 3 will not be described again herein.

The video processor 180 processes video data that is received by the display apparatus 100*a*. The video processor 180 may perform a variety of image processing, such as decoding, scaling, noise filtering, frame rate transformation, and resolution transformation, on the received video data.

A graphics processor 181 generates a screen image including various objects, such as an icon, an image, and a text, by using an arithmetic unit and a rendering unit, which may include hardware and/or software. The arithmetic unit calculates attribute values, such as a coordinate value, a shape, a size, a color, and the like, with which each object is to be displayed according to layouts of the screen image, based on the user interaction sensed by the sensor 160. The rendering unit generates screen images of various layouts including objects, based on the attribute values calculated by the arithmetic unit. The screen images generated by the rendering unit are displayed on a display area of the display 110.

According to an exemplary embodiment, the video processor 180 may extract information about a channel corresponding to content provided by the image providing apparatus 310 via the rendering unit by using a character recognition technique, such as OCR, from a predetermined area of an image of the content.

The display 110 displays video included in a broadcasting signal received via the tuner 140 on the screen thereof, under the control of the controller 130. The display 110 may also display content (for example, a moving picture) that is input via the communication interface 150 or the I/O interface 170. The display 110 may output an image stored in the memory 120 under the control of the controller 130.

The display 110 may generate a driving signal by converting an image signal, a data signal, an on-screen display (OSD) signal, and a control signal that are processed by the controller 130. The display 110 may be a plasma display panel (PDP), a liquid-crystal display (LCD), an organic light-emitting device (OLED), a flexible display, or a 3-dimensional (3D) display. The display 110 may be configured as a touch screen, and thus may serve as an input device as well as an output device.

The audio processor 115 processes audio data. The audio processor 115 may perform a variety of processing, such as decoding, amplification, or noise filtering, on the audio data. The audio processor 115 may include a plurality of audio processing modules to process audios corresponding to a plurality of pieces of content.

The audio output interface 126 outputs audio included in a broadcasting signal received via the tuner 140, under the control of the controller 130. The audio output interface 126 may also output audio (for example, a voice or a sound) that is input via the communication interface 150 or the I/O interface 170. The audio output interface 126 may also output audio stored in the memory 120 under the control of the controller 130. The audio output interface 126 may include at least one selected from among a speaker 127, a headphone output port 128, and a Sony/Philips Digital Interface (S/PDIF) output port 129. The audio output interface 126 may include a combination of the speaker 127, the headphone output port 128, and the S/PDIF output port 129.

The tuner 140 may tune and select only a frequency of a channel which the display apparatus 100*a* wants to receive from among many radio wave components that are obtained via amplification, mixing, resonance, or the like of a wired or wireless broadcasting signal. The broadcasting signal includes audio, video, and additional information (for example, an EPG).

The tuner 140 may receive a broadcasting signal in a frequency band corresponding to a channel signal according to a user input (for example, a control signal received from the remote control apparatus 200, for example, a channel number input, a channel up-down, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 is decoded (for example, audio decoding, video decoding, or additional information decoding) and is thus divided into audio, video, and/or additional information. The audio, the video, and/or the additional information may be stored in the memory 120 under the control of the controller 130.

The display apparatus 100*a* may include a single tuner 140 or a plurality of tuners 140. The tuner 140 may be all-in-one with the display apparatus 100*a*, or implemented as a separate apparatus (for example, a tuner that is connected to a set-top box and the I/O interface 170) having a tuner that is electrically connected to the display apparatus 100*a*.

The communication interface 150 may connect the display apparatus 100*a* to an external apparatus (for example, an audio apparatus) under the control of the controller 130. The controller 130 may transmit/receive content to/from the external apparatus connected via the communication interface 150, download an application from the external apparatus, or perform web-browsing. The communication interface 150 may include a wireless local area network (LAN) 151, a Bluetooth network 152, or a wired Ethernet network 153 in correspondence to a performance and a structure of the display apparatus 100*a*. The communication interface 150 may include a combination of the wireless LAN 151, the Bluetooth network 152, and the wired Ethernet network 153. The communication interface 150 may receive a control signal of the remote control apparatus 200 under the control of the controller 130. The control signal may be implemented as a Bluetooth signal, an RF signal, or a Wi-Fi signal.

The communication interface 150 may further include a short-range communication (for example, near field communication (NFC) or Bluetooth low energy (BLE)), in addition to the Bluetooth network 152.

According to an exemplary embodiment, the communication interface 150 may receive content corresponding to a virtual channel from a content-providing server.

The sensor 160 senses a voice of a user, an image of the user, or an interaction with the user, and may include a microphone 161, a camera 162, and a light receiver 163.

The microphone 161 receives an uttered voice of the user. The microphone 161 may transform the received voice into an electrical signal and output the electrical signal to the controller 130. The user voice may include, for example, a voice corresponding to a menu or function of the display apparatus 100a.

The camera 162 may receive an image (for example, consecutive frames) corresponding to a motion of the user including a gesture within a recognition range of the camera 162. The controller 130 may select a menu that is displayed on the display apparatus 100a by using a result of the recognition of the received motion, or perform control corresponding to the result of the motion recognition.

The light receiver 163 receives an optical signal (including a control signal) from the remote control apparatus 200 outside the display apparatus 100a. The light receiver 163 may receive an optical signal corresponding to a user input (for example, touch, pressing, a touch gesture, a voice, or a motion) from the remote control apparatus 200. A control signal may be extracted from the received optical signal under the control of the controller 130. For example, the light receiver 163 may receive a control signal corresponding to a channel up/down button for channel switching from the remote control apparatus 200.

The I/O interface 170 receives video (for example, a moving picture), audio (for example, a voice or music), and additional information (for example, an EPG) from outside the display apparatus 100a under the control of the controller 130. The I/O interface 170 may include an HDMI port 171, a component jack 172, a PC port 173, or a USB port 174. The /O interface 170 may include a combination of the HDMI port 171, the component jack 172, the PC port 173, and the USB port 174.

The memory 120 may store various data, programs, or applications for driving and controlling the display apparatus 100a under the control of the controller 130. The memory 120 may store input/output signals or data corresponding to driving of the video processor 180, the display 110, the audio processor 115, the audio output interface 126, the power supply 190, the tuner 140, the communication interface 150, the sensor 160, and the I/O interface 170.

The memory 120 may store an operating system (OS) 121 for controlling the display apparatus 100a and the controller 130, an application 122 initially provided by a manufacturer or downloaded from outside of the display apparatus 100a, a graphical user interface (GUI) associated with the application 122, objects (for example, an image text, an icon, and a button) for providing the GUI, user information, a document, databases, or related pieces of data.

In particular, according to an exemplary embodiment, the memory 120 includes an integrated channel control module 123 including at least one instruction for generating an integrated channel list including channels of at least one external apparatus connected to the display apparatus 100a and performing a channel control according to the integrated channel list, a character recognition module 124 including at least one instruction for recognizing channel information from content received from the image providing apparatus 310, and a multi-brand remote control (MBR) module 125 including at least one instruction for a channel control from the image providing apparatus 310. The modules are software such as one or more programs which include one or more instructions that are stored in the memory 120 and may include code made by a compiler and executable by a controller 130.

The memory 120 includes a read-only memory (ROM), a random-access memory (RAM), or a memory card (e.g., a micro SD card or a USB memory) mounted in the display apparatus 100a. The memory 120 may include a non-volatile memory, a volatile memory, a hard disk drive (HDD), or a solid state drive (SSD).

The controller 130 controls an overall operation of the display apparatus 100a and signal transfer among the internal components of the display apparatus 100a and processes data. When there is an input of a user or stored preset conditions are satisfied, the controller 130 may execute the operating system (OS) and various applications that are stored in the memory 120.

The controller 130 may include a RAM that stores a signal or data input by an external source of the display apparatus 100a or is used as a memory area for various operations performed by the display apparatus 100a, a ROM that stores a control program for controlling the display apparatus 100a, and a processor.

The processor used in the controller 130 may include a graphics processing unit (GPU) for performing video graphics processing. The processor may be implemented by using a System On Chip (SoC) into which a core and a GPU are incorporated.

The processor may include a plurality of processors. For example, the processor may be implemented using a main processor and a sub-processor operating in a sleep mode.

According to an exemplary embodiment, by executing at least one instruction stored in the memory 120, the controller 130 may configure a channel list including first channel information corresponding to an external image providing apparatus connected to the display apparatus 100a and second channel information providable via an application installed in the display apparatus 100a, control a source corresponding to a channel selected in response to an input of selecting one channel from the channel list, and provide content obtained from the controlled source to the display 110. At this time, the controller 130 may include, in the first channel information, channel information corresponding to a powered-on external image providing apparatus from among external image providing apparatuses connected to the display apparatus 100a.

By executing at least one instruction stored in the memory 120, the controller 130 according to an exemplary embodiment may identify current channel information corresponding to content that is currently displayed on the display apparatus 100a, and may control at least one channel included in the channel list by using the identified current channel information.

When the display apparatus 100a displays content received from an external image providing apparatus, the controller 130, according to an exemplary embodiment, may identify the current channel information by recognizing a character from at least a portion of a content image displayed on the display apparatus 100a, by executing at least one instruction stored in the memory 120. When the display apparatus displays content received from an application installed in the display apparatus 100a, the controller 130, according to an exemplary embodiment, may identify the current channel information, based on channel information received from the application, by executing at least one instruction stored in the memory 120.

By executing at least one instruction stored in the memory 120, the controller 130, according to an exemplary embodiment, may determine a target channel, based on the identified current channel information and the channel list, in response to a channel switch input of requesting a channel switch, and, when a source corresponding to the determined target channel is different from a source corresponding to the identified current channel information, may switch an image source of the display apparatus 100a to the source corresponding to the determined target channel.

When the identified current channel information is within a channel range providable by the external image providing apparatus and the determined target channel is within a channel range providable by the application installed in the display apparatus 100a, the controller 130, according to an exemplary embodiment, may switch the image source of the display apparatus 100a to the application and provide information about the determined target channel to the application, by executing at least one instruction stored in the memory 120.

When the identified current channel information is within the channel range providable by the application and the determined target channel is within the channel range providable by the external image providing apparatus, the controller 130 according to an exemplary embodiment may switch the image source of the display apparatus 100a to an external source corresponding to the external image providing apparatus and transmit information about the determined target channel to the external image providing apparatus, by executing at least one instruction stored in the memory 120.

By executing at least one instruction stored in the memory 120, the controller 130 according to an exemplary embodiment may generate a channel control code signal that is based on target channel information, and transmit the generated channel control code signal to the external image providing apparatus by using an IR blaster or transmit the channel control code signal to a remote control apparatus such that the remote control apparatus may transmit the channel control code signal to the external image providing apparatus.

By executing at least one instruction stored in the memory 120, the controller 130 according to an exemplary embodiment may determine a target channel, based on the identified current channel information and the channel list, in response to a channel switch input of requesting a channel switch, and, when a source corresponding to the determined target channel is identical with a source corresponding to the identified current channel information, may provide information about the determined target channel to a source that currently provides content.

The display apparatus 100a having the display 110 may be electrically connected to an external apparatus (for example, a set-top box) having a tuner. For example, the display apparatus 100a may be implemented by using an analog TV, a digital TV, a 3D TV, a smart TV, an LED TV, an OLED TV, a plasma TV, a monitor, or the like, but it will be easily understood by one of ordinary skill in the art to which the disclosure pertains that exemplary embodiments are not limited thereto.

The block diagram of the display apparatus 100a illustrated in FIG. 4 is an exemplary embodiment. Components illustrated in FIG. 4 may be combined or omitted according to the specifications of the display apparatus 100a when being implemented, or additional components may be included in the block diagram of FIG. 4. In other words, two or more components may be combined into a single component, or a single component may be divided into two or more components. A function performed in each block is merely an example to explain exemplary embodiments, and a detailed operation or device of each block does not limit the scope of exemplary embodiments.

Figure 5:
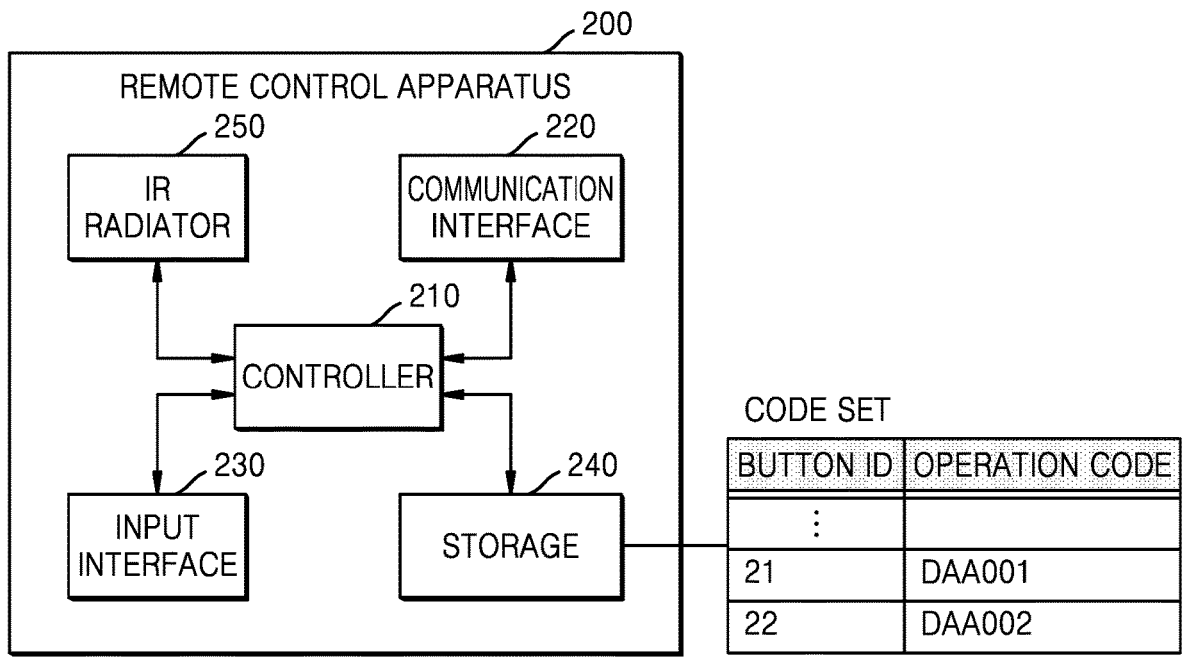
FIG. 5 is a block diagram illustrating a structure of a remote control apparatus, according to an embodiment.

FIG. 5 is a block diagram illustrating a structure of the remote control apparatus 200, according to an exemplary embodiment.

Referring to FIG. 5, the remote control apparatus 200 includes a controller 210, a communication interface 220, an input interface 230, a storage 240, and an IR radiator 250.

The communication interface 220 is capable of bidirectional communication and may receive data from outside of the remote control apparatus 200 or transmit data to outside the remote control apparatus 200. The communication interface 220 may be implemented by using, for example, a Bluetooth module. In this case, the communication interface 220 may receive data from outside of the remote control apparatus 200 (from an external apparatus) and may transmit more data outside of the remote control apparatus 200 (to an external device) than data that may be transmitted using the IR radiator 250.

The input interface 230 may include a plurality of buttons, a key, a touch pad, or the like that is manipulated by a user. For example, the input interface 230 includes a 4-directional (up, down, left, and right) button and an enter button, and further includes a button for each supported function. A key identifier (ID) or a button ID is assigned to each button of the input interface 230.

When the storage 240 receives a code set from outside of the remote control apparatus 200 via the communication interface 220, the storage 240 stores the code set. When an input occurs on the input interface 230, the storage 240 provides the code set such that the controller 210 may determine an operation code control signal corresponding to the input.

The code set stored in the storage 240 (which is a memory, by way of an example) is obtained by mapping an ID of each button of the remote control apparatus 200 with an operation code corresponding to each ID. Button IDs and operation codes follow a prescribed grammar, and thus various grammars are applicable according to a standard that is applied to a remote controller and a display apparatus.

For example, a button ID of a channel-up button is 21, and an operation code corresponding to the button ID 21 is DAA001. When a user presses the channel-up button, the controller 210 determines that a button having the button ID 21 is pressed, and derives an operation code corresponding to the button ID 21, namely, DAA001, from the code set. The controller 210 transmits a control signal generated based on the derived operation code DAA001 to the display apparatus 100 via the IR radiator 250. The display apparatus 100 derives the operation code DAA001 from the control signal received from the remote control apparatus 200, and performs an operation of moving up through channels, in correspondence with the derived operation code.

The IR radiator 250 is provided to transmit the control signal generated by the controller 210 in the form of IR light. The IR radiator 250 is able to receive neither information nor signals from outside of the remote control apparatus 200, and performs unidirectional communication of transmitting a control signal to outside of the remote control apparatus 200.

When the communication interface 220 receives a code set of a specific apparatus, the controller 210 controls the storage 240 to store the code set. In this case, the remote control apparatus 200 may then control the specific apparatus by using the stored code set. Alternatively, the remote control apparatus 200 may be provided to receive a new code set from the display apparatus 100 as necessary without storing a code set in the storage 240. When a plurality of code sets are stored in the storage 240, the controller 210 may select and use one from among the plurality of code sets.

When one button of the input interface 230 is manipulated, the controller 210 searches for an operation code corresponding to a button ID of the manipulated button from the code set. The controller 210 generates a control signal corresponding to the found operation code and transmits the generated control signal to the display apparatus 100 via the IR radiator 250. Accordingly, the remote control apparatus 200 may control an operation of an apparatus (such as the display apparatus 100) corresponding to a stored code set.

In general, the remote control apparatus 200 is able to store a code set as shown in FIG. 5 in the storage 240 and control the display apparatus 100 by using the stored code set. However, according to exemplary embodiments, because the display apparatus 100 generates an integrated channel list by integrating channels of a plurality of sources, namely, a set-top box and the other sources, and controls and manages the integrated channel list, the display apparatus 100 determines an operation code corresponding to a specific user input. Accordingly, in exemplary embodiments, the remote control apparatus 200 transmits an IR signal corresponding to an input button ID to the display apparatus 100 without referring to the code set stored in the storage 240.

For example, when a user presses the channel-up button, the controller 210 transmits an IR signal including information of the button ID 21 corresponding to the channel-up button to the display apparatus 100 via the IR radiator 250. The display apparatus 100 may analyze a channel switch command corresponding to the channel-up button and determine, based on the analysis, whether the display apparatus 100 needs to control a set-top box or another source. Then, when the display apparatus 100 needs to control a set-top box, the display apparatus 100 may transmit a channel control code signal corresponding to the channel-up button command directly to a set-top box by using an IR blaster, or may transmit the channel control code signal corresponding to the channel-up button command to the remote control apparatus 200. The remote control apparatus 200 may transmit a channel control IR signal corresponding to the channel control code signal received via the communication interface 220 to the set-top box via the IR radiator 250.

Figure 6:
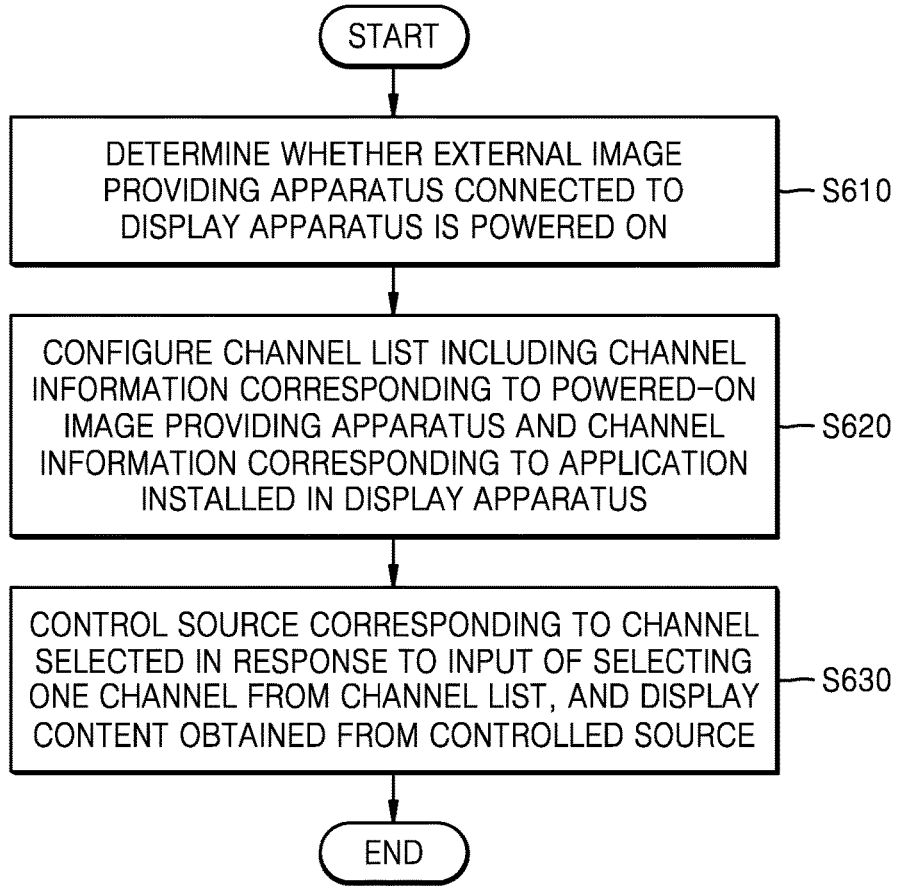
FIG. 6 is a flowchart illustrating a method of operating a display apparatus, according to an embodiment.

FIG. 6 is a flowchart illustrating a method of operating a display apparatus, according to an exemplary embodiment.

Referring to FIG. 6, in operation S610, the display apparatus 100 determines whether an external image providing apparatus 310 connected to the display apparatus 100 is powered on.

For example, when the display apparatus 100 receives a user input of turning on the display apparatus 100 in a standby mode or a low power status, the controller 130 of the display apparatus 100 may determine whether the image providing apparatus 310 connected to the display apparatus 100 is powered on.

In operation S620, the display apparatus 100 configures a channel list including channel information corresponding to a powered-on image providing apparatus and channel information provided by an application installed in the display apparatus 100.

For example, when an image providing apparatus is powered on, the display apparatus 100 may obtain channel list information providable by the image providing apparatus from the image providing apparatus connected via an HDMI, and add a virtual channel list to the obtained channel list information, thereby configuring an integrated channel list. A channel list may be configured in a table form.

In FIG. 6, a channel list including channel information corresponding to a powered-on image providing apparatus is configured. However, exemplary embodiments are not limited thereto. According to exemplary embodiments, the display apparatus 100 may configure a channel list including channel information corresponding to an image providing apparatus connected to the display apparatus 100 regardless of whether the image providing apparatus is powered on or off.

FIGS. 7A and 7B are views illustrating a set-top box mode channel list and a TV mode channel list, respectively, according to an exemplary embodiment.

Referring to FIG. 7A, reference numeral 710 indicates a set-top box mode channel list obtained by integrating set-top box channels with virtual channels provided by an application when a set-top box is powered on, and a reference numeral 720 of FIG. 7B indicates a TV mode channel list in a TV mode when no set-top boxes are powered on.

Referring back to FIG. 6, in operation S630, the display apparatus 100 may control a source corresponding to a channel selected in response to an input of selecting one channel from the channel list, and display content obtained from the controlled source. At this time, the display apparatus 100 may switch an image source of the display apparatus 100 to the source corresponding to the selected channel.

FIG. 8 is a view illustrating a table of the channel list configured by the display apparatus 100, according to an exemplary embodiment.

Referring to FIG. 8, a channel list 800 may include a channel number 810, a channel ID 820, and a source 830. In the channel list 800, channel numbers 1 through 100 are assigned channels of a set-top box as an example of an image providing apparatus, and channel numbers 101 and 102 are assigned virtual channels. In the example of FIG. 8, the virtual channels are arranged after the channels of the set-top box. However, exemplary embodiments are not limited thereto, and a location relationship between virtual channels and set-top box channels may be variously set. In this case, a value indicating the source 830 identifying whether each channel included in the channel list is a set-top box channel or a virtual channel may be stored.

According to an exemplary embodiment, a structure of the channel list may be edited according to a selection by a user. For example, the display apparatus 100 may provide a UI enabling a user to edit an integrated channel list including both the set-top box channels and the virtual channels.

According to an exemplary embodiment, the display apparatus 100 may rearrange set-top box channels and virtual channels in an order based on related content or the same broadcasting company when configuring the channel list. When configuring the channel list, the display apparatus 100 may locate virtual channels at various positions including in front of and after a set-top box channel list.

For example, the display apparatus 100 may recognize information about set-top box channels and compare the recognized information about set-top box channels with virtual channel information, and accordingly configure the channel list such that channels are arranged close to each other based on the same broadcasting company or related content.

Reference numeral 900 of FIG. 9 indicates an example of a channel list in which set-top box channels and virtual channels provided by an application are arranged close to each other, based on the same broadcasting company. Referring to FIG. 9, virtual channels provided by the SBS broadcasting company are arranged right after set-top box channels corresponding to the SBS broadcasting company, and virtual channels provided by the MBC broadcasting company are arranged right after set-top box channels corresponding to the MBC broadcasting company.

According to an exemplary embodiment, when a set-top box is powered on and another external apparatus connected to the display apparatus 100 is also powered on, the display apparatus 100 may include a source of the powered-on external apparatus in a channel list. The various external apparatuses 300 of FIG. 1A may be connected to the display apparatus 100 via the I/O interface 170 of FIG. 4 and may provide content that is to be reproduced by the display apparatus 100. Accordingly, when the display apparatus 100 is powered on, the display apparatus 100 may determine whether at least one external apparatus connected to the display apparatus 100 is powered on, and allocate a channel number to at least one external apparatus source connected to the display apparatus 100 and powered on to thereby configure a channel list.

FIG. 10 is a schematic diagram illustrating other external apparatus sources in addition to a set-top box being included in a channel list, according to an exemplary embodiment.

Referring to FIG. 10, a channel list 1000 includes a general TV channel 1010, a set-top box channels 1020, virtual channels 1030, an external apparatus channels 1040, and applications 1050. A channel that belongs to the general TV channel 1010 but is not overlapped by the set-top box channel 1020 may be included in the channel list 1000. The channel list 1000 may include, as the external apparatus channels 1040, a PC port in a channel number 700, a play station connected via HDMI1 in a channel number 800, a BD player connected via HDMI2 in a channel number 900, a USB source connected via a USB port in a channel number 1000, and a mobile phone connected via Wifi or Wifi-direct in a channel number 1100. In the channel list 1000, the applications 1050 may be allocated as one or more channels. A channel number 1200 is allocated to content-providing app 1, such as the YouTube app installed on the TV, a channel number 1300 is allocated to content-providing app 2, such as the Netflix app installed on the TV, and a channel number 1400 is allocated to a TV guide app installed on the TV.

An external apparatus connected to the display apparatus 100 and powered on may be considered to be highly likely to be used by a user at any time. Accordingly, when a channel list is configured by including such a powered-on external apparatus, the user may switch an image source of the display apparatus 100 to a source of the external apparatus by only a selection of an external apparatus channel included in the channel list, and thus the user may conveniently switch a source without additional manipulations, such as a mode switch. For example, the user may switch an image source of the display apparatus 100 to a channel 700 corresponding to the next highest channel number after a virtual channel 602 by simply performing an operation of pressing a channel-up button of the remote control apparatus 200 while watching ATVPlus3, being a virtual channel corresponding to the channel 602 by using the display apparatus 100. When the display apparatus 100 receives a channel switch command corresponding to the channel-up button of the remote control apparatus 200 while displaying ATVPlus3, being the virtual channel corresponding to the channel 602, the display apparatus 100 may check from the channel list 1000 that a PC port source corresponding to the channel 700 corresponds to an upward channel of the channel 602. At this time, the display apparatus 100 may switch the image source of the display apparatus 100 to the PC port source. The controller 130 of the display apparatus 100 may control the PC port 173 to receive content from a PC.

According to another exemplary embodiment, a powered-off external apparatus may be included in a channel list. In this case, when a display apparatus needs to switch an image source of the display apparatus to the powered-off external apparatus, the display apparatus may transmit a command for powering off an external apparatus to the external apparatus. For example, when a PC has been powered off, the display apparatus transmits, to the PC, a message for turning on the PC.

Alternatively, even when a channel list is initially configured by including powered-on external apparatuses, at least one external apparatus may be powered off due to several causes. Even in this case, the display apparatus may transmit a command for turning on an external apparatus to the powered-off external apparatus, in order to switch the image source to the powered-off external apparatus.

Figure 11:
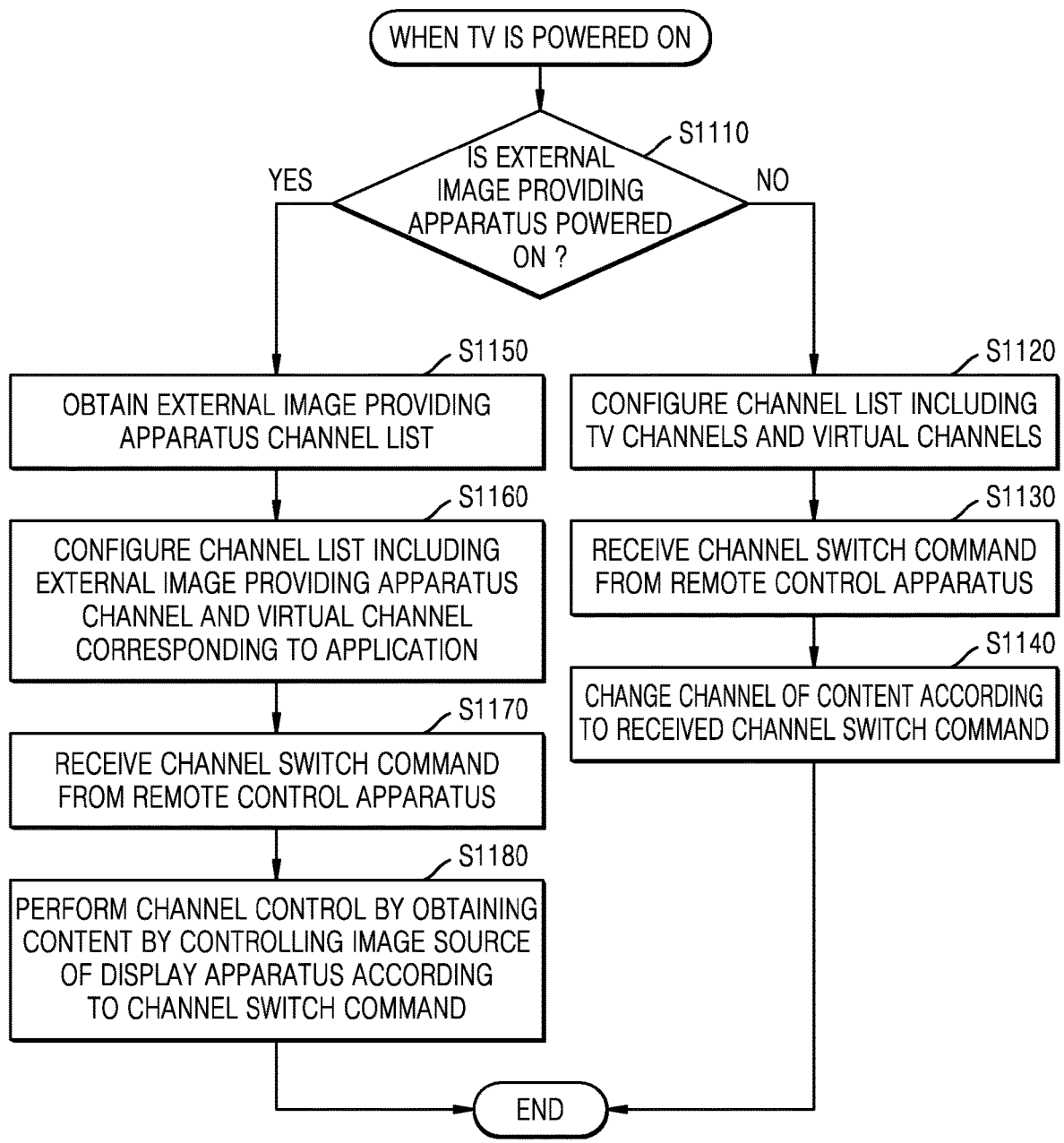
FIG. 11 is a flowchart illustrating a method of operating a display apparatus, according to another embodiment.

FIG. 11 is a flowchart illustrating a method of operating a display apparatus, according to another exemplary embodiment.

Referring to FIG. 11, in operation S1110, when the display apparatus is turned on, the display apparatus determines whether an external image providing apparatus connected to the display apparatus is powered on.

In operation S1120, when it is determined that the external image providing apparatus is not powered on, the display apparatus configures a channel list including TV channels and virtual channels providable by applications installed in the display apparatus. The channel list including the TV channels and the virtual channels is, for example, the TV mode channel list 720 of FIG. 7.

In operation S1130, the display apparatus receives a channel switch command from a remote control apparatus.

In operation S1140, the display apparatus changes a channel of content displayed on a display of the display apparatus, according to the received channel switch command.

In operation S1150, when it is determined that the external image providing apparatus is powered on, the display apparatus obtains an external image providing apparatus channel list from the external image providing apparatus or a server of an external image providing apparatus provider.

In operation S1160, the display apparatus configures a channel list including at least one set-top box channel and at least one virtual channel by using the obtained external image providing apparatus channel list and a virtual channel list provided by an application.

In operation S1170, the display apparatus receives the channel switch command from the remote control apparatus.

In operation S1180, the display apparatus performs channel control by obtaining content by controlling an image source of the display apparatus according to the channel switch command received from the remote control apparatus.

Figure 12:
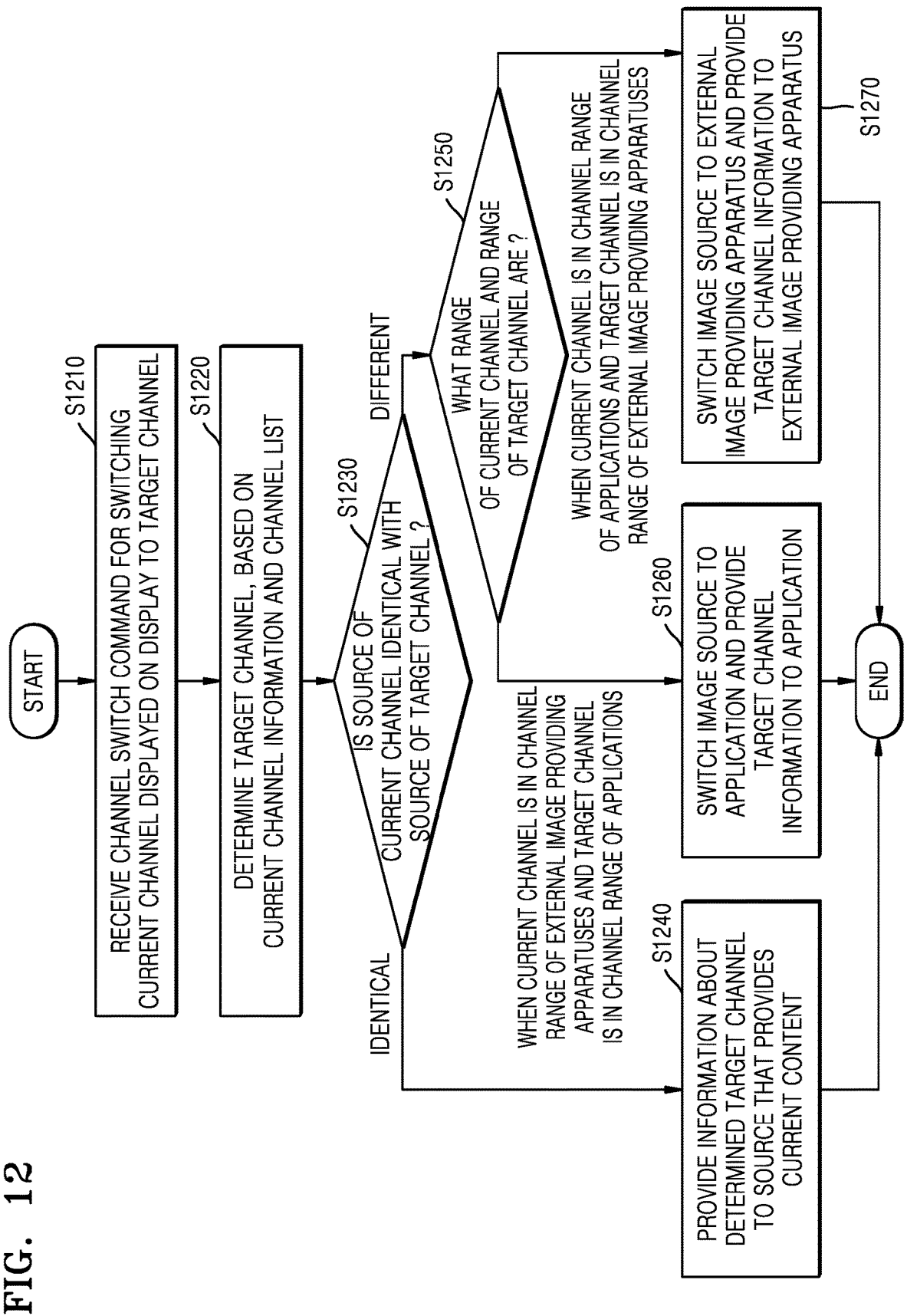
FIG. 12 is a flowchart illustrating an operation of performing channel control according to a channel range that is based on a channel switch command, according to an embodiment.

FIG. 12 is a flowchart illustrating an operation of performing channel control in response to a channel switch command, according to an exemplary embodiment.

Referring to FIG. 12, in operation S1210, the display apparatus 100 may receive a channel switch command from the external remote control apparatus 200.

In operation S1220, the display apparatus 100 may determine a target channel, based on current channel information and a channel list. When an image providing source is an external image providing apparatus, the display apparatus 100 may identify channel information of content via character recognition, for example, OCR, from a predetermined area of a content image displayed on a display of the display apparatus 100. On the other hand, when the image providing source is an application, the display apparatus 100 may identify, from the application, current channel information corresponding to content currently being provided by the application. Accordingly, the display apparatus 100 may always ascertain channel information of content that is currently displayed on the display, according to an exemplary embodiment. As described above, the display apparatus 100 may identify the target channel, based on the current channel information and the channel list. For example, when the display apparatus 100 receives a channel up command and ascertains from the channel list 800 of FIG. 8 that a current channel number is 100, the display apparatus 100 may determine that a target channel based on the channel up command is a channel number 101. The display apparatus 100 may ascertain that a source corresponding to the channel number 101 is a set-top box and a source corresponding to the channel number 101 is a virtual channel.

In operation S1230, the display apparatus 100 may determine whether the source of the current channel is identical with the source of the target channel.

In operation S1240, when the source of the current channel is identical with the source of the target channel, the display apparatus 100 may provide information about the determined target channel to a source that provides current content. For example, in the example of FIG. 8, when the current channel is a channel with the channel number of 99 and the target channel is a channel with the channel number of 100 and thus the source of the current channel and the source of the target channel are the same, that is, a set-top box, the display apparatus 100 may provide a channel up command to a set-top box that provides current content.

In operation S1250, when the source of the current channel is different from the source of the target channel, the display apparatus 100 may determine a range of the current channel and a range of the target channel.

In operation S1260, when it is determined that the current channel is in a channel range of external image providing apparatuses and the target channel is in a channel range of applications, the display apparatus 100 may switch the image source to an application and provide the target channel information to the application.

In operation S1270, when it is determined that the current channel is in the channel range of applications and the target channel is in the channel range of external image providing apparatuses, the display apparatus 100 may switch the image source to an external image providing apparatus and provide the target channel information to the external image providing apparatus.

Figure 13:
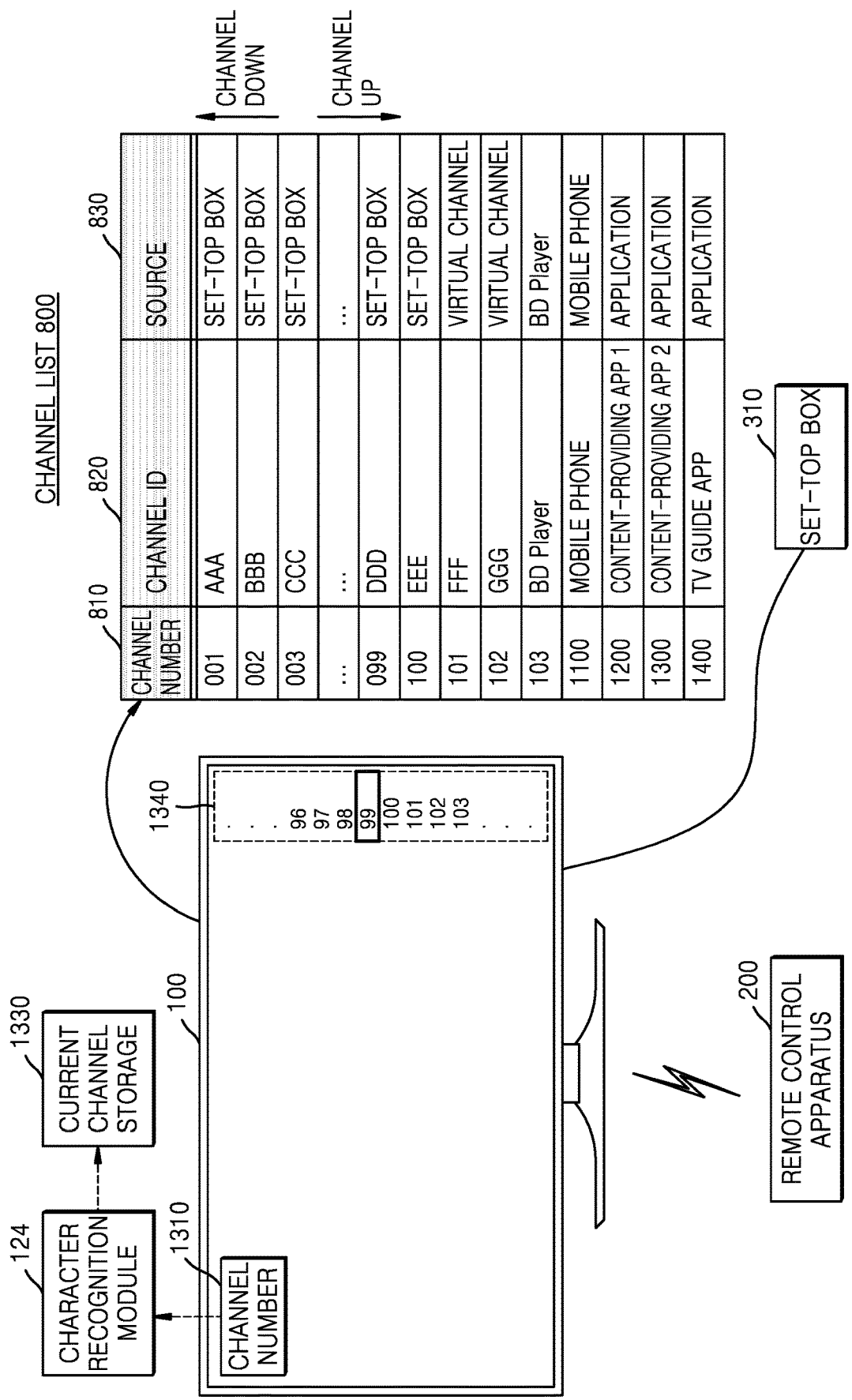
FIG. 13 is a reference view illustrating an operation of performing a channel control according to a channel range, according to an embodiment.

FIG. 13 is a view illustrating an operation of performing channel control in response to a channel switch command, such as the ones depicted with reference to FIG. 12, according to an exemplary embodiment.

Referring to FIG. 13, the display apparatus 100 may receive a signal corresponding to an input button of the remote control apparatus 200, the input button indicating power on, and may start booting.

When the display apparatus 100 is turned on, the display apparatus 100 may determine whether a set-top box 310 connected to the display apparatus 100 is powered on. When the set-top box 310 is powered on, the display apparatus 100 may configure a channel list by integrating set-top box channel information received from the set-top box 310 and virtual channel information provided by an application installed in the display apparatus 100. The display apparatus 100 may allocate channel numbers to not only the set-top box 310 but also external apparatus sources connected to the display apparatus 100 and insert the set-top box 310 and the external apparatus sources into the channel list. In some cases, only powered-on external apparatus sources may be inserted into the channel list.

For example, when a set-top box and a BD player are connected to the display apparatus 100, the display apparatus 100 may configure a channel list 800 of FIG. 13. In the channel list 800, set-top box channels are allocated to channel numbers 1 through 100, virtual channels are allocated to channel numbers 101 and 102, and a BD player source is allocated to a channel number 103.

Content displayed on the display apparatus 100 that is powered on may be determined in various ways from among the channels included in the channel list 800. The display apparatus 100 may display content corresponding to a pre-stored specific channel number or display content corresponding to an arbitrary channel transmitted by a set-top box. Alternatively, the display apparatus 100 may display a configured channel list UI without displaying specific content.

When the display apparatus 100 is powered on and then content is displayed on the display of the display apparatus 100 or when a user presses a button by using the remote control apparatus 200 in order to achieve a channel search, the display apparatus 100 may display, on the display, a channel list UI 1340 for showing the channel list 800 configured by the display apparatus 100. The channel list UI 1340 may be displayed when a channel up or down command is consecutively received. While the channel list UI 1340 is being displayed, the user may move fast to a desired channel by consecutively pressing a channel up or down key. In addition, the display apparatus 100 may provide a visual effect, namely, a channel indicator, to a channel number corresponding to a current channel in order to identify a channel corresponding to content currently being displayed on the display from the channel list UI 1340. For example, on the channel list UI 1340 of FIG. 13, a channel number 99 is highlighted to indicate that the channel number 99 is the current channel. The channel list UI 1340 may further include additional information indicating the source of a corresponding channel. When many channels are included in a channel list, the additional information may be displayed for only a channel registered as a preferred channel by a user or an arbitrary channel.

When a channel of the content being currently displayed on the display apparatus 100 is a channel with the channel number of 99, the user may input a channel switch command by using the remote control apparatus 200. For example, the user may input a channel switch command by pressing a channel-up or channel-down button of the remote control apparatus 200. When the user presses the channel-up button, the display apparatus 100 may switch the current channel to a channel 100. When the user presses the channel-down button, the display apparatus 100 may switch the current channel to a channel 98.

For example, when a channel of the content currently being displayed on the display apparatus 100 is 99 and the user presses the channel-up button by using the remote control apparatus 200, the display apparatus 100 may receive a channel switch command from the remote control apparatus 200 and accordingly may control the set-top box 310 to provide content corresponding to the channel 100, which is next to the channel 99. In this case, because the current channel and the target channel are providable by the same source, namely, a set-top box, the display apparatus 100 may provide information corresponding to a channel-up instead of target channel information to the set-top box. When a channel switch is requested by manipulation of a channel indicator while the channel list UI 1340 is being displayed, even when the sources of the current channel and the target channel are the same, the display apparatus may provide the target channel information to the set-top box 310.

Because the channel list 800 configured by the display apparatus 100 contains information about content from a plurality of sources, the display apparatus 100 needs to recognize a channel number of content currently being displayed on the display apparatus 100. When the display apparatus 100 recognizes the channel number of the content currently being displayed on the display apparatus 100, as described above, the display apparatus 100 is able to appropriately control a source corresponding to a changed channel when the current channel is changed according to the channel switch command.

The display apparatus 100 may recognize the channel number of the content currently being displayed on the display apparatus 100 by using a character recognition method. Examples of the character recognition method include OCR.

The set-top box 310 may receive a broadcasting signal via a cable, process the received broadcasting signal, and transmit the processed broadcasting signal to the display apparatus 100. At this time, when the user switches a channel while watching a broadcasting channel, the set-top box 310 may add information about the switched channel, namely, information including a channel number, a broadcasting station name, and a broadcasting content title, to an image of broadcasting content corresponding to the switched channel in an OSD form and transmit the image with the information to the display apparatus 100.

The set-top box 310 adds an OSD to the image according to OSD composition information that composes the OSD, and the OSD composition information differs according to set-top boxes. OSD composition information corresponding to a set-top box may be transmitted from the set-top box to a display apparatus or may be transmitted to the display apparatus via an external server. The OSD composition information includes information about locations, sizes, a distance, and the like of OSD components, such as a channel number, a broadcasting station name, and a content title, displayed on the display apparatus, and differs according to set-top boxes.

The character recognition module 124 included in the display apparatus 100 may recognize an input image as a character. For example, the character recognition module 124 may use an OCR method. The character recognition module 124 may extract the OSD components from an area of content according to the OSD composition information and recognize the OSD components as characters to thereby obtain information about a displayed image. According to such a recognition module, the display apparatus 100 may obtain channel information corresponding to a content image received from the set-top box, from the received content image.

As such, when an image source is a set-top box, the display apparatus 100 may identify a channel number regarding the content currently being displayed on the display apparatus 100 by using, for example, the OCR method, and may store the identified channel number in, for example, a current channel storage 1330. Because the display apparatus 100 receives a channel number corresponding to content from an application when an image source is the application, the display apparatus 100 may identify the channel number corresponding to the content provided by the application, and may store the identified channel number in the current channel storage 1330.

In response to a channel switch command from the remote control apparatus 200, the display apparatus 100 may control a source apparatus according to the channel switch command by using a current channel stored in the current channel storage 1330 and the channel list 800.

In detail, in response to the channel switch command, the display apparatus 100 may identify the current channel and may determine the target channel by using the identified current channel and the channel list.

When the identified current channel and the target channel are provided by the same source, the display apparatus 100 may transmit a control signal corresponding to the channel switch command to the source. For example, when a channel currently being displayed on the display apparatus 100 is a channel 100 and a user presses the channel-down button by using the remote control apparatus 200, a channel providing content that is to be displayed according to the channel-down button is a channel 99, and a source corresponding to the channel 99 is a set-top box. Accordingly, the display apparatus 100 may transmit a channel control signal corresponding to the channel-down button to the set-top box. A method in which the display apparatus 100 transmits the channel control signal to the set-top box will be described later with reference to FIG. 14 or 15.

When the identified current channel and the target channel are provided by different sources, the display apparatus 100 may switch the image source of the display apparatus 100 to a source corresponding to the target channel, and may provide a control signal corresponding to the channel switch command to the source corresponding to the target channel.

For example, when the channel currently being displayed on the display apparatus 100 is the channel 100 and a user has pressed again the channel-up button by using the remote control apparatus 200, the remote control apparatus 200 may transmit a channel control command corresponding to the channel-up button to the display apparatus 100. An MBR module 125 of the display apparatus 100 may receive the channel control command from the remote control apparatus 200 and may identify a channel number currently being displayed on the display apparatus 100. Because the channel number of the content currently being displayed on the display apparatus 100 is 100, a current channel number is 100, and a channel number corresponding to a channel up command, namely, a target channel number, may be identified from the channel list 800. It may be checked from the channel list 800 of FIG. 13 that a channel number corresponding to a channel up and next to the channel number 100 is 101, and a source corresponding to the target channel 101 is an application virtual channel. As such, because sources of the current channel and the target channel are different, the display apparatus 100 may switch the image source of the display apparatus 100 to the source of the target channel, namely, an application, and provide information about the target channel to the application, thereby performing a channel control.

When the channel currently being displayed on the display apparatus 100 is a channel 102 and a user has pressed again the channel-up button by using the remote control apparatus 200, the remote control apparatus 200 may transmit a channel control command corresponding to the channel-up button to the display apparatus 100. The MBR module 125 of the display apparatus 100 may receive the channel control command from the remote control apparatus 200 and may identify a channel number currently being displayed on the display apparatus 100. The channel number of the content currently being displayed on the display apparatus 100 is 102, and a channel number corresponding to a channel up may be identified from the channel list 800. It may be checked from the channel list 800 of FIG. 13 that a channel number corresponding to a channel up and next to the channel number 102 is 103, and a source corresponding to the target channel 103 is a BD player. Because a source to be controlled according to the channel control command is a BD player, the display apparatus 100 may control the BD player to transmit content to the display apparatus 100.

When the display apparatus 100 performs a channel control according to a channel switch command received from the remote control apparatus 200 and a source to be controlled is a set-top box, the display apparatus 100 transmits a channel control code signal to the set-top box. On the other hand, when the source to be controlled is not a set-top box, the display apparatus 100 needs to pay attention not to transmit the channel control code signal to the set-top box.

For example, when the display apparatus 100 displays a channel 101 and a user presses the channel-down button by using the remote control apparatus 200, the display apparatus 100 may identify that the current channel is 101 and may identify from the channel list 800 that the target channel is 102, namely, a set-top box channel. When a channel switch from a source other than a set-top box, namely, from an application virtual channel, to a set-top box source is performed, the display apparatus 100 has difficulty in checking a channel maintained by a current set-top box. Thus, the display apparatus 100 may transmit a channel control code signal corresponding to a command of instructing a switch to a channel number, instead of a channel control code signal corresponding to a channel-up or channel-down command, to the set-top box. For example, when the display apparatus 100 receives a channel down command while displaying the channel 101, the display apparatus 100 may check the channel 100 and may transmit, to the set-top box, a channel control code corresponding to a command of instructing a switch to the channel 100.

Examples of a method in which the display apparatus 100 controls the set-top box 310 include a method in which the display apparatus 100 directly controls the set-top box 310 and a method in which the display apparatus 100 controls the set-top box 310 via the remote control apparatus 200, according to exemplary embodiments.

First, the method in which the display apparatus 100 directly controls the set-top box 310 will be described with reference to FIG. 14, according to an example embodiment.

Figure 14:
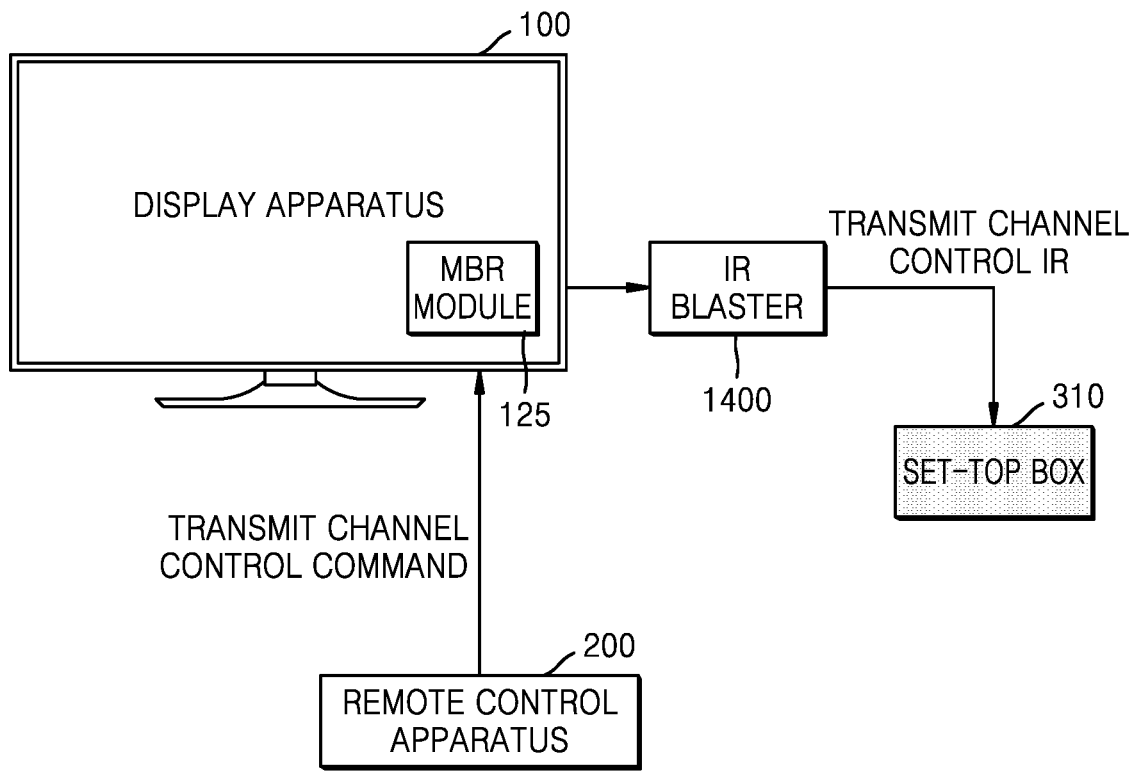
FIG. 14 is a diagram illustrating a display apparatus directly controlling a set-top box, according to an embodiment.

Referring to FIG. 14, when the display apparatus 100 displays content corresponding to the channel 99 and a user presses a channel-up button by using the remote control apparatus 200, the remote control apparatus 200 may transmit a channel control command corresponding to the channel-up button to the display apparatus 100. The MBR module 125 of the display apparatus 100 may receive the channel control command from the remote control apparatus 200 and may identify a channel number currently being displayed on the display apparatus 100. The channel number of the content currently being displayed on the display apparatus 100 is 99, and a channel number corresponding to a channel up may be identified from the channel list 800. It may be checked from the channel list 800 of FIG. 13 that a channel number corresponding to a channel up and next to the channel number 99 is 100, and a source corresponding to the target channel 100 is a set-top box. Because a source to be controlled according to the channel control command is a set-top box, the display apparatus 100 may transmit a code signal corresponding to the channel up to the set-top box 310. In other words, the MBR module 125 of the display apparatus 100 may search a code set corresponding to the set-top box 310 to find a code corresponding to the channel up command, and may transmit a code signal corresponding to the found code to an IR blaster 1400. The IR blaster 1400 may transmit channel control IR corresponding to the received code signal to the set-top box 310.

The set-top box 310 may execute a channel up command according to the received channel control IR, and thus may add an OSD component to content corresponding to the channel 100 next to the channel 99 and transmit the content with the added OSD component to the display apparatus 100.

Next, the method in which the display apparatus 100 controls the set-top box 310 via the remote control apparatus 200 will be described with reference to FIG. 15, according to an exemplary embodiment.

Figure 15:
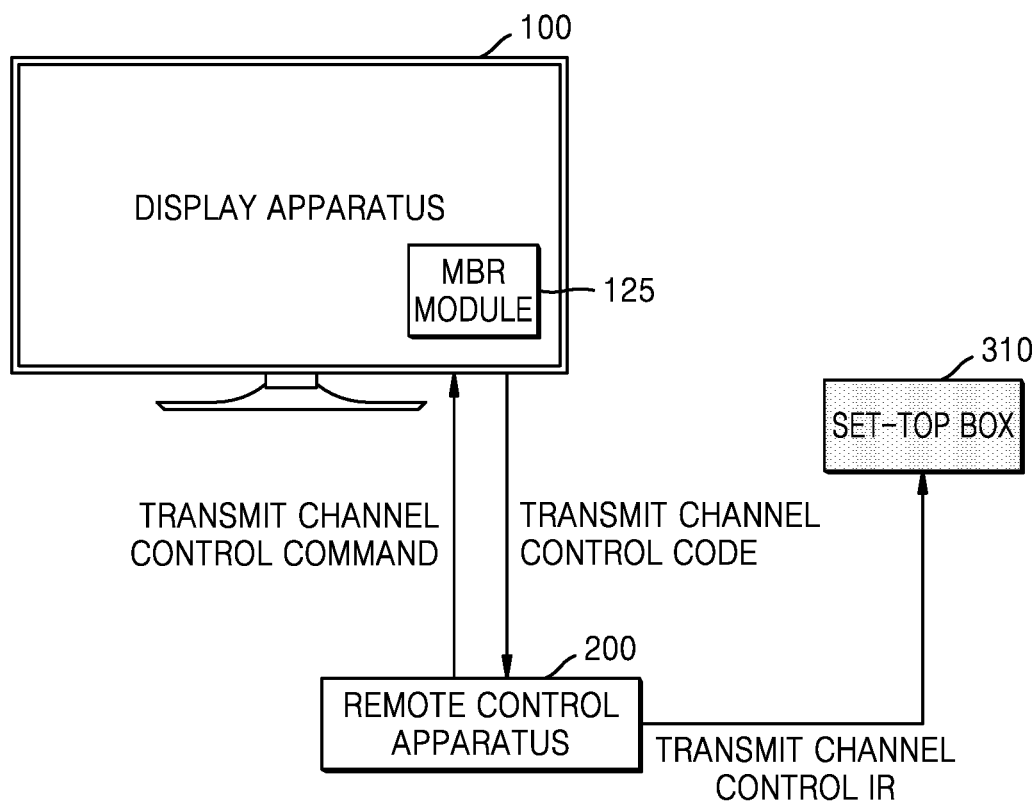
FIG. 15 is a diagram illustrating a display apparatus controlling a set-top box by using a remote control apparatus, according to an embodiment.

Referring to FIG. 15, when the display apparatus 100 displays content corresponding to the channel 99 and a user presses a channel-up button by using the remote control apparatus 200, the remote control apparatus 200 may transmit a channel control command corresponding to the channel-up button to the display apparatus 100. The MBR module 125 of the display apparatus 100 may receive the channel control command from the remote control apparatus 200 and may identify a channel number currently being displayed on the display apparatus 100. The channel number of the content currently being displayed on the display apparatus 100 is 99, and a channel number corresponding to a channel up may be identified from the channel list 800. It may be checked from the channel list 800 of FIG. 13 that a channel number corresponding to a channel up and next to the channel number 99 is 100, and a source corresponding to the target channel 100 is a set-top box. Because a source to be controlled according to the channel control command is a set-top box, the display apparatus 100 may transmit a code signal corresponding to the channel up to the remote control apparatus 200. In other words, the MBR module 125 of the display apparatus 100 may search a code set corresponding to the set-top box 310 to find a code corresponding to the channel up command, and may transmit a code signal corresponding to the found code to the remote control apparatus 200. The remote control apparatus 200 may transmit channel control IR corresponding to the received code signal to the set-top box 310.

The set-top box 310 may execute a channel up command according to the received channel control IR, and thus may add an OSD component to content corresponding to the channel 100 next to the channel 99 and transmit the content with the added OSD component to the display apparatus 100.

According to exemplary embodiments, an integrated channel list including channels of an external apparatus source including set-top box, virtual channels, and TV channels are provided, and thus a switch among a set-top box channel and a virtual channel, or channels corresponding to the external apparatus source may be achieved without a mode change by a user's intervention.

A method of operating a display apparatus according to an exemplary embodiment may be embodied as program commands executable by various computer components and may be recorded on a computer-readable recording medium. The computer-readable recording medium may include program commands, data files, data structures, and the like separately or in combinations. The program commands to be recorded on the computer-readable recording medium may be specially designed and configured for exemplary embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The exemplary embodiments should be considered in descriptive sense only and not for purposes of limitation. Descriptions of features or aspects within each exemplary embodiment should typically be considered as available for other similar features or aspects in other embodiments.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims, and their equivalents.

What is claimed is:

1. A display apparatus comprising:
   a display;
   a memory configured to store at least one instruction; and
   a processor configured to execute the at least one instruction to:
      generate an integrated channel list comprising first channel information corresponding to an external image providing apparatus connected to the display apparatus and second channel information corresponding to an application installed in the display apparatus, wherein the first channel information comprises information about a first plurality of channels which are provided by the external image providing apparatus, and the second channel information comprises information about a second plurality of channels which are provided by the application;
      identify current channel information corresponding to a content currently being displayed on the display,
      in response to a user input of a request for a channel switch including a channel up or down, determine a target channel, based on the identified current channel information and the integrated channel list;
      identify whether a source corresponding to the target channel is a same as a source providing the currently displayed content, each of the source corresponding to the target channel and the source providing the currently displayed content being the external image providing apparatus or the application; and
      control the source corresponding to the target channel to display an image corresponding to the determined target channel,
   wherein the processor is further configured to execute the at least one instruction to:
      based on the source corresponding to the target channel being the same as the source providing the currently displayed content, transmit a channel switch command corresponding to the channel up or the channel down to the source providing the currently displayed content, and
      based on the source corresponding to the target channel being different from the source providing the currently displayed content, switch an image source of the display apparatus to the source corresponding to the target channel and transmit information of a channel number of the target channel to the source corresponding to the target channel.

2. The display apparatus of claim 1, wherein the processor is further configured to execute the at least one instruction to:
   in response to a power-on of the display apparatus, determine whether the external image providing apparatus is powered on; and,
   in response to the determining that the external image providing apparatus is powered on, generate the integrated channel list comprising the first channel information and the second channel information.

3. The display apparatus of claim 1, wherein the processor is further configured to execute the at least one instruction to:
   in response to a first content received from the external image providing apparatus being displayed on the display, obtain the current channel information by recognizing at least one character from the displayed content; and
   in response to a second content received via the application being displayed on the display, obtain the current channel information, based on the second channel information provided from the application.

4. The display apparatus of claim 1, wherein the processor is further configured to execute the at least one instruction to:
   determine a first channel range providable by the source corresponding to the target channel based on the integrated channel list;
   determine a second channel range providable by the source providing the currently displayed content based on the integrated channel list, and
   in response to the determining that the identified current channel information corresponds to the second channel range, which is providable by the external image providing apparatus, which is the source providing the currently displayed content, and the determined target channel corresponds to the first channel range, which is providable by the application installed in the display apparatus, which is the source corresponding to the target channel, switch the image source of the display apparatus to the application and provide information about the determined target channel to the application.

5. The display apparatus of claim 1, wherein the processor is further configured to execute the at least one instruction to:
determine a first channel range providable by the source corresponding to the target channel based on the integrated channel list;
determine a second channel range providable by source providing the currently displayed content based on the integrated channel list, and
in response to the determining that the identified current channel information corresponds to the second channel range providable by the application, which is the source providing the currently displayed content, and that the determined target channel corresponds to the first channel range providable by the external image providing apparatus, which is the source corresponding to the target channel, switch the image source of the display apparatus to an external source corresponding to the external image providing apparatus and provide information about the determined target channel to the external image providing apparatus.

6. The display apparatus of claim 5, wherein the processor is further configured to execute the at least one instruction to:
generate a channel control code signal based on the target channel; and
transmit the generated channel control code signal to the external image providing apparatus by using an infrared (IR) blaster or transmit the generated channel control code signal to a remote control apparatus such that the channel control code signal is transmitted by the remote control apparatus to the external image providing apparatus.

7. The display apparatus of claim 1, wherein the processor is further configured to execute the at least one instruction to;
detect that the external image providing apparatus is powered off;
in response to the processor detecting that the external image providing apparatus has been turned off, regenerate the integrated channel list to exclude the first channel information.

8. A method of operating a display apparatus, the method comprising:
generating an integrated channel list comprising first, channel information corresponding to an external image providing apparatus connected to the display apparatus and second channel information corresponding to an application installed in the display apparatus, wherein the first channel information comprises information about a first plurality of channels which are provided by the external image providing apparatus, and the second channel information comprises information about a second plurality of channels which are provided by the application;
identifying current channel information corresponding to a content currently being displayed on a display,
in response to a user input of a request for a channel switch including a channel up or a channel down, determining a target channel, based on the identified current channel information and the integrated channel list;
identifying whether a source corresponding to the target channel is a same as a source providing the currently displayed content, each of the source corresponding to the target channel and the source providing the currently displayed content being the external image providing apparatus or the application; and
controlling the source corresponding to the target channel to display an image corresponding to the determined target channel,
wherein the controlling the source corresponding to the target channel comprises:
based on the source corresponding to the target channel being the same as the source providing the currently displayed content, transmitting a channel switch command corresponding to the channel up or the channel down to the source providing the currently displayed content, and
based on the source corresponding to the target channel being different from the source providing the currently displayed content, switching an image source of the display apparatus to the source corresponding to the target channel and transmitting information of a channel number of the target channel to the source corresponding to the target channel.

9. The method of claim 8, further comprising:
in response to power-on of the display apparatus, determining whether the external image providing apparatus is powered on, and
in response to the external image providing apparatus being determined to be powered on, generating the integrated channel list comprising the first channel information and the second channel information.

10. The method of claim 8, further comprising:
in response to a first content received from the external image providing apparatus being displayed on, the display apparatus, identifying the current channel information by recognizing at least one character from the displayed content; and
in response to a second content received via the application installed in the display apparatus being displayed on the display apparatus, identifying the current channel information, based on the second channel information provided from the application.

11. The method of claim 8, further comprising:
determining a first channel range providable by the source corresponding to the target channel based on the integrated channel list;
determining a second channel range providable by the source providing the currently displayed content based on the integrated channel list; and
in response to determining that the second channel range is providable by the external image providing apparatus, which is source providing the currently displayed content and that the first channel range is providable by the application installed in the display apparatus, which is the source corresponding to the target channel, switching the image source of the display apparatus to the application and providing information about the determined target channel to the application.

12. The method of claim 8, further comprising:
determining a first channel range providable by source corresponding to the target channel based on the integrated channel list;
determining a second channel range providable by the source providing the currently displayed content based on the integrated channel list; and
in response to the determining that the second channel range is providable by the application, which is the source providing the currently displayed content, and that the first channel range is providable by the external image providing apparatus, which is the source corresponding to the target channel, switching the image source of the display apparatus to an external source corresponding to the external image providing apparatus and providing information about the determined target channel to the external image providing apparatus.

13. The method of claim 12, further comprising:

generating a channel control code signal based on the determined target channel; and transmitting the generated channel control code signal to the external image providing apparatus by using an infrared (IR) blaster or transmitting the generated channel control code signal to a remote control apparatus such that the channel control code signal is transmitted by the remote control apparatus to the external image providing apparatus.

14. A computer program product comprising at least one non-transitory computer-readable storage medium having recorded thereon a program, which, when executed by a computer, performs the method of claim 8.

* * * * *